(12) United States Patent
Kobayashi

(10) Patent No.: US 6,522,330 B2
(45) Date of Patent: Feb. 18, 2003

(54) CHARACTER PROCESSING SYSTEM AND METHOD

(75) Inventor: Tatsuo Kobayashi, Kanagawa (JP)

(73) Assignee: Justsystem Corporation, Tokushima (JP)

( * ) Notice: Subject to any disclaimer, the term of this patent is extended or adjusted under 35 U.S.C. 154(b) by 249 days.

(21) Appl. No.: 09/736,450

(22) Filed: Dec. 15, 2000

(65) Prior Publication Data

US 2001/0019329 A1 Sep. 6, 2001

Related U.S. Application Data

(63) Continuation of application No. 08/863,420, filed on May 27, 1997, now abandoned.

(30) Foreign Application Priority Data

Feb. 17, 1997 (JP) ................................. 9-032376

(51) Int. Cl.[7] ................................. G06T 11/00
(52) U.S. Cl. .................. 345/467; 345/470; 345/471; 345/530
(58) Field of Search ................ 345/467, 470, 345/471, 530

(56) References Cited

U.S. PATENT DOCUMENTS

| | | | |
|---|---|---|---|
| 4,879,666 A | 11/1989 | Kenbo | |
| 4,947,342 A | 8/1990 | Katsura et al. | |
| 5,164,900 A | 11/1992 | Bernath | |
| 5,367,634 A | 11/1994 | Nakamura | |
| 5,513,278 A | 4/1996 | Hashizume et al. | |
| 5,526,477 A | 6/1996 | Mcconnell et al. | |
| 5,567,061 A | 10/1996 | Nagata | |
| 5,706,462 A | 1/1998 | Matousek | |
| 5,784,062 A | 7/1998 | Adachi et al. | |
| 5,801,680 A | 9/1998 | Minakuchi | |
| 5,805,783 A | * 9/1998 | Ellson et al. | ............... 345/468 |
| 5,831,617 A | 11/1998 | Bhukhanwala | |

FOREIGN PATENT DOCUMENTS

| | | |
|---|---|---|
| JP | 57-129487 | 8/1982 |
| JP | 60-73670 | 4/1985 |
| JP | 2-300848 | 12/1990 |
| JP | 3-134769 | 6/1991 |
| JP | 3-177963 | 8/1991 |
| JP | 4-46445 | 2/1992 |
| JP | 4-47446 | 2/1992 |
| JP | 4-47447 | 2/1992 |
| JP | 4-47451 | 2/1992 |
| JP | 4-225467 | 8/1992 |
| JP | 4-332073 | 11/1992 |
| JP | 4-332074 | 11/1992 |
| JP | 5-108616 | 4/1993 |
| JP | 5-158995 | 6/1993 |
| JP | 6-19882 | 1/1994 |
| JP | 7-105194 | 4/1995 |
| JP | 7-105196 | 4/1995 |
| JP | 7-105201 | 4/1995 |
| JP | 8-106454 | 4/1996 |
| JP | 8-161302 | 6/1996 |
| JP | 8-241304 | 9/1996 |

* cited by examiner

Primary Examiner—Jeffery Brier
Assistant Examiner—Faranak Fouladi
(74) Attorney, Agent, or Firm—McDermott, Will & Emery

(57) ABSTRACT

A character processing apparatus has a font storage area with at least fonts for representative characters stored therein, and a character information table with storage address for the fonts, no-font information or the like stored therein. A retrieving section is provided for receiving arbitrary inputted character code, referring to storage address information or no-font information in the character information table, and outputting the storage address information corresponding to character code for a representative character having the same group number and the same type information as that of the retrieved character code according to type information as well as to group information when there is no-font information. A display control section and a display section are included for receiving a corresponding font from the font storage area and displaying a character for the arbitrary character code on a screen according to the storage address information inputted from the retrieving section.

20 Claims, 16 Drawing Sheets

| CHARACTER CODE | ADDRESS INFORMATION | TYPE INFORMATION | GROUP INFORMATION |
|---|---|---|---|
| 4E00 （一） | A000 | 代 | 0000 |
| ⋮ | ⋮ | ⋮ | ⋮ |
| 58F6 （並） | — | 異 | 1349 |
| 58F7 （竝） | — | 異 | 1349 |
| ⋮ | ⋮ | ⋮ | ⋮ |
| 58FA （壺） | C805 | 代 | 1349 |
| 58FB （壻） | C836 | 代 | 1350 |
| 58FC （壼） | — | 異 | 1349 |
| ⋮ | ⋮ | ⋮ | ⋮ |
| 9BF5 （鯵）| F231 | 代 | 1822 |
| ⋮ | ⋮ | ⋮ | ⋮ |
| 9C3A （蔘）| — | 異 | 1822 |
| ⋮ | ⋮ | ⋮ | ⋮ |
| 9D0E （隋）| F50A | 代 | 1910 |
| ⋮ | ⋮ | ⋮ | ⋮ |
| 9DD7 （闇）| — | 異 | 1910 |
| ⋮ | ⋮ | ⋮ | ⋮ |

FIG.3

| GROUP NO. | REPRESENTATIVE CHARACTER | VARIANT FONT CHARACTER | | |
|---|---|---|---|---|
| 1338 | 壜 58DC | | | |
| 1339 | 壟 58DF | 壠 58E0 | | |
| 1340 | 壢 58E2 | | | |
| 1341 | 壩 58E9 | 坝 575D | | |
| 1342 | 士 58EB | | | |
| 1343 | 壬 58EC | | | |
| 1344 | 壮 58EE | 壯 58EF | | |
| 1345 | 声 58F0 | | | |
| 1346 | 壱 58F1 | | | |
| 1347 | 売 58F2 | | | |
| 1348 | 壹 58F9 | | | |
| 1349 | 壺 58FA | 壷 58F6 | 壼 58F7 | 壺 58FC |
| 1350 | 壻 58FB | | | |

FIG.6

| CHARACTER CODE | ADDRESS INFORMATION | TYPE INFORMATION | GROUP INFORMATION |
|---|---|---|---|
| 4E00（一） | A000 | 代 | 0000 |
| ⋮ | ⋮ | ⋮ | ⋮ |
| 58F6（壶） | — | 異 | 1349 |
| 58F7（壷） | — | 異 | 1349 |
| ⋮ | ⋮ | ⋮ | ⋮ |
| 58FA（壺） | C805 | 代 | 1349 |
| 58FB（壻） | C836 | 代 | 1350 |
| 58FC（壼） | — | 異 | 1349 |
| ⋮ | ⋮ | ⋮ | ⋮ |
| 9BF5（鯵） | F231 | 代 | 1822 |
| ⋮ | ⋮ | ⋮ | ⋮ |
| 9C3A（鰺） | — | 異 | 1822 |
| ⋮ | ⋮ | ⋮ | ⋮ |
| 9D0E（鴎） | F50A | 代 | 1910 |
| ⋮ | ⋮ | ⋮ | ⋮ |
| 9DD7（鷗） | — | 異 | 1910 |
| ⋮ | ⋮ | ⋮ | ⋮ |

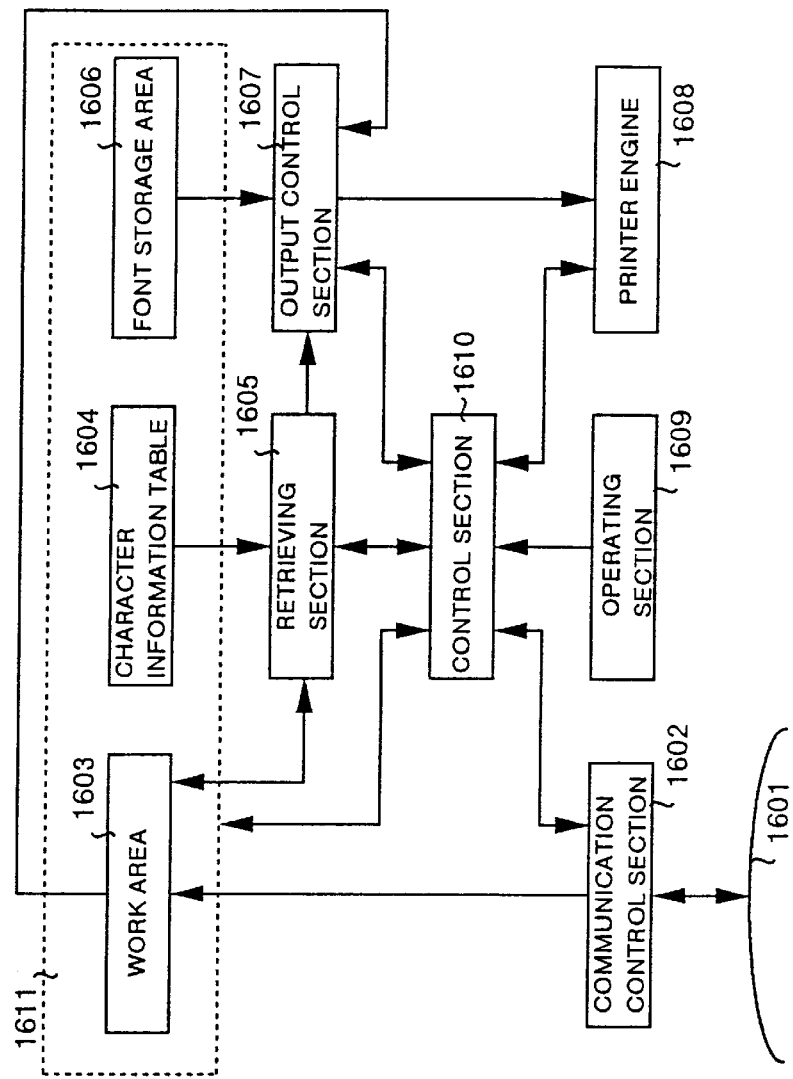

CHARACTER PROCESSING SYSTEM AND METHOD

This application is a continuation of application Ser. No. 08/863,420, filed May 27, 1997, now abandoned.

FIELD OF THE INVENTION

The present invention relates to character processing and, more particularly, to character processing of variant font characters.

BACKGROUND OF THE INVENTION

In Chinese characters, a variant font character is pronounced the same and also has the same meaning as another Chinese character, but has a different shape. For instance, 壺 (pronounced "tsubo" and meaning "pot") is a variant character for 壼 (pronounced the same and means the same). The variant font character as described above is a character that is not generally used and is rarely registered in a Chinese character dictionary for a word processor or the like. Various ways for inputting or displaying a variant font character on a screen have been developed and disclosed.

For instance, as a first example of the conventional technology in this field, Japanese Patent Laid-Open Publication No. HEI 2-300848 discloses a "Variant character font retrieving system". This Japanese Patent Laid-Open Publication No. HEI 2-300848 discloses a system comprising a font data storing means for storing font data for various types of characters, and a font retrieving/information storing means for storing a storage address of corresponding font data indexed by the character code of the character and a storage address of font data corresponding to a variant font character for this character code. The variant character can be displayed on a screen by retrieving the font data from the font retrieving/information storing means using the character code for a corresponding arbitrary character to obtain a storage address for the font data.

As a second example of the conventional technology in this field, there has been disclosed the "Chinese characters classifying method, Chinese characters classification table, and Chinese character processing apparatus" in Japanese Patent Laid-Open Publication No. HEI 3-177963. This Japanese Patent Laid-Open Publication No. HEI 3-177963 discloses a system comprising a storing means for storing Chinese character information classified so that a group is formed by designating a character with a generally used font as a representative character and designating a character that is pronounced the same but has the different meaning as the representative character as a variant font character. If there is any such variant font character corresponding to a representative character, the variant font character is regarded as the same character. Thus, the storing means is accessed when an arbitrary Chinese character has a variant font character, and the variant font character for the Chinese character is outputted, printed or displayed.

Further, as a third example of the conventional technology, there has been disclosed the "Character processing apparatus" in Japanese Patent Laid-Open Publication No. HEI 4-47445. This Japanese Patent Laid-Open Publication No. HEI 4-47445 discloses the technology in which, when a Chinese character is converted to a variant font character, candidate variant font characters are displayed in a form of a list by referring to a variant font character conversion dictionary in which variant font characters are stored. An operator is prompted to select a desired character from the list.

However, in each of the conventional systems described above, for instance, when a character code for a specific, modern Chinese character that is not used in Japanese is inputted, the character code installed in each of these systems is different. In addition fonts corresponding to character code for Chinese are not prepared in each of the systems, so that a character for the inputted character code is sometimes not displayed on a screen or is garbled into to a strange shape.

There is the Universal Multiple-Octet Coded Character Set (described as UCS hereinafter) in which groups of international characters and relationships between the character groups and coded expressions are defined. The term UCS is applied to IS010646, JISX 0221, or Unicode (Unicode is a trade mark of Unicode, Inc.), and in these standards all international characters are expressed with 16-bit character codes. For instance, if all the character UCS codes and fonts corresponding to the UCS character codes are stored in a character processing apparatus, and if text data is transacted with the UCS character codes, text data prepared in any language can be displayed on a screen. However, the UCS includes character codes for around 40,000 characters in total, and a substantially large memory space is required to store in a computer or the like all the fonts corresponding to these character codes. It is generally said that an ordinary person uses around 5000 characters, and it is very wasteful even to store fonts corresponding to character codes for characters usually not used in a character processing apparatus. Especially, the variant font characters as described above are those with fonts rarely used, and for this reason it may be said that it is not necessary to store all fonts corresponding to character code for variant font characters in a character processing apparatus. On the other hand, to reduce the required memory space, if the number of fonts is excessively reduced, in a case where a character code for a character with a font not stored in the character processing apparatus is inputted, the character can not be displayed or the character may be garbled into to a strange shape.

SUMMARY OF THE INVENTION

It is an object of the present invention to prevent the garbling of characters as well as to enable accurate screen display of characters, even when the character code for a character with a font not stored in the character processing apparatus is inputted, such that the number of fonts to be stored in a character processing apparatus and the memory space required for storing fonts are reduced.

In a character processing apparatus according to the present invention, character groups are divided to groups comprising representative characters and variant font characters. When a variant font character (character code) with a font not stored in the apparatus is inputted, a representative character belonging to the same group is displayed in place of the variant font character on a screen.

In the character processing apparatus according to the present invention, when a representative character is displayed on a screen in place of a variant font character (character code) with a font not stored in the apparatus, the representative character is displayed with a different color from that of other characters.

In the character processing apparatus according to the present invention, a representative character is not only displayed on a screen in place of a variant font character (character code) with a font not stored in the apparatus, but the character code itself for the variant font character is also converted to that for a representative character.

In the character processing apparatus according to the present invention, it is possible to efficiently process character code for around 40,000 characters based on the UCS.

In a character processing system according to the present invention, even when a variant font character (character code) with a font not stored in the character processing apparatus is inputted, a corresponding font is received from a font output device so that the corresponding variant font character can be displayed on a screen.

In the character processing system according to the present invention, required fonts for variant font characters can additionally be stored to make the processing for displaying characters on a screen more efficient.

In the character processing system according to the present invention, character codes for around 40,000 characters defined in the UCS can efficiently be processed.

In the character processing apparatus according to the present invention, character groups are classified into groups of representative and variant font characters. When a variant font character (character code) with a font not stored in the apparatus is inputted, a representative character belonging to the same group as the variant font character is printed on recording paper in place of the variant font character.

In a character processing method, character groups are divided into groups of representative characters and variant font characters. When a variant font character (character code) with a font not stored in the character processing apparatus is inputted, a representative character belonging to the same group as the variant font character is displayed on a screen in place of the variant font character.

In the character processing method according to the present invention, when a representative character belonging to the same group is displayed on a screen in place of a variant font character (character code) with a font not stored in the character processing apparatus, the color of the representative character is different from that of other characters.

In the character processing method according to the present invention, a representative character is not only displayed on a screen in place of a variant font character (character code) with a font not stored in the character processing apparatus, but the character code itself for the variant font character is also replaced with character code for the representative character.

In the character processing method according to the present invention, even when a variant font character (character code) with a font not stored in a character processing apparatus is inputted in the apparatus, corresponding font data is received from a font output device and the corresponding variant font character can be displayed on a screen.

In the character processing method according to the present invention, fonts for variant font characters can be added as needed, so that the processing for displaying characters on a screen can efficiently be executed.

In the character processing method according to the present invention, character code defined according to the UCS for around 40,000 characters can efficiently be processed.

A computer-readable medium according to the present invention enables execution of a program recorded therein by a computer and also makes it possible to display a representative character belonging to the same group on a screen, when a variant font character (character code) with a font not stored in the character processing apparatus is inputted, in place of the variant font character.

Other objects and features of this invention will become understood from the following description with reference to the accompanying drawings.

BRIEF DESCRIPTION OF THE DRAWINGS

FIG. 3 is an explanatory view showing a case where character groups defined according to the UCS are groups each consisting of characters which are pronounced the same but have different meaning and different fonts, a character having a font most often used in the group is regarded as a representative character for the group, and further a group number for differentiating a group from other groups is assigned to each group;

FIG. 6 is an explanatory view showing structure of a character information table in the character processing apparatus according to Embodiment 1 of the present invention;

FIG. 16 is a block diagram showing a character processing apparatus according to Embodiment 3 of the present invention.

DESCRIPTION OF THE PREFERRED EMBODIMENTS

Detailed description is made hereinafter for embodiments of the character processing apparatus, character processing system, character processing method and computer-readable medium with a program for causing a computer to execute the method stored therein according to the present invention with reference to the related drawings. It should be noted that description is first made for an outline of the present invention to make the characteristics of the present invention clear and then specifically made for the embodiments of the present invention.

It is assumed that characters shown in Table 1 described later are used when description is made for the embodiments of the present invention. It is also assumed that each expression such as "Character (1)" or "Character (2)" in the description below indicates each character shown in Table 1.

TABLE 1

| | CHARACTER |
|---|---|
| (1) | 壱 |
| (2) | 壺 |
| (3) | 壼 |
| (4) | 壹 |
| (5) | 参 |
| (6) | 參 |
| (7) | 鴎 |
| (8) | 鷗 |

It is assumed that the character code used in the description of the embodiments of the present invention is specified in UCS (Universal Coded Character Set) described in the background section in this specification. The expression "character code" indicates the character code specified in the UCS. It should be noted that the UCS includes IS010646, JISX0221, and Unicode, and character code applicable to the present invention is not restricted to the UCS.

Figure 1:
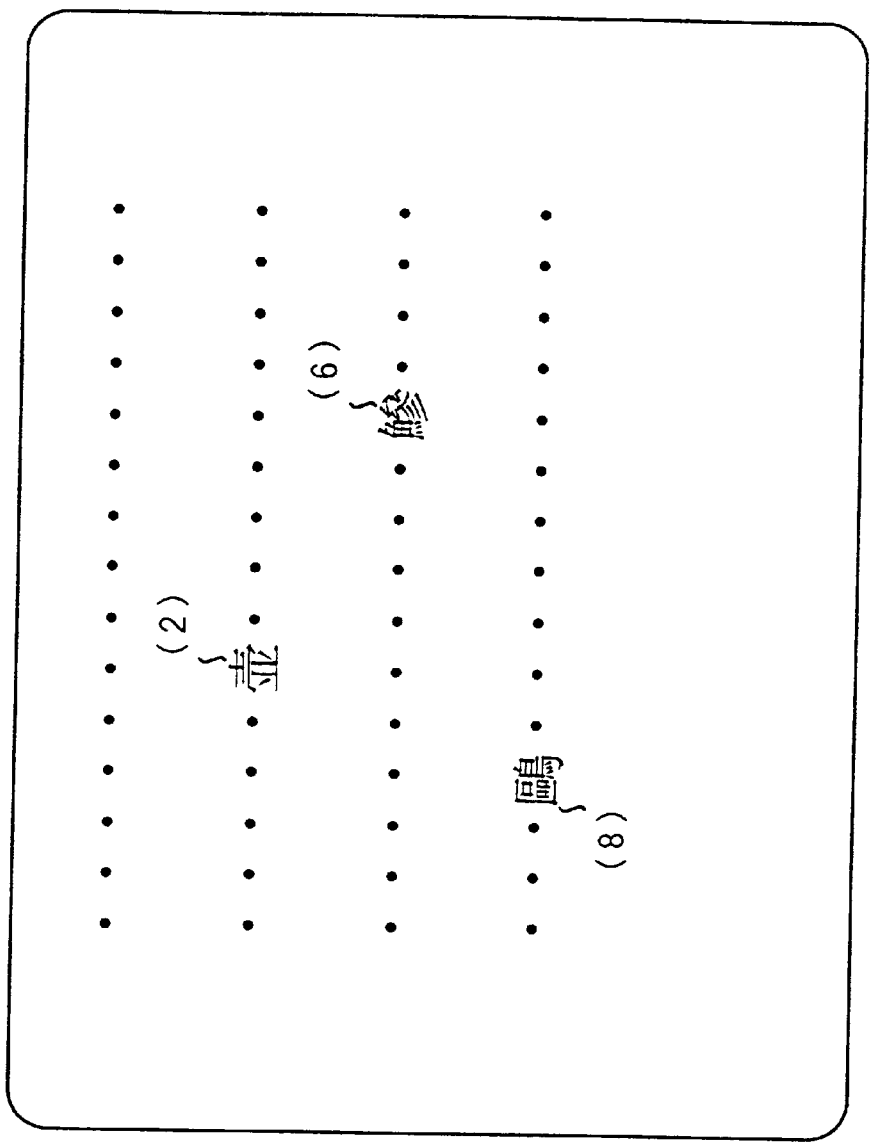
FIG. 1 is an explanatory view showing an example of a screen display in a character processing apparatus with all fonts each corresponding to each character code having been prepared therein.

As described above, the UCS has about 40,000 international characters each expressed in 16 bits. In any character processing apparatus providing therein all of the character code according to the UCS and the corresponding fonts, any character can easily be displayed on a display screen without garbling any character even in text written, for instance, in Chinese characters in the Chinese language. FIG. 1 is an explanatory view showing one of examples of a screen display in the character processing apparatus providing therein all types of fonts each corresponding to each in the character code. As shown in FIG. 1, in the character processing apparatus storing therein all types of fonts corresponding to the character code, Character (2), Character (6) and Character (8), each corresponding to the variant font character described in the Prior Art in this specification, can also be displayed correctly on the screen garbling the character. However, there are 40,000 characters in total for the character code specified in the UCS, so that storing all the character codes and the corresponding fonts in the character processing apparatus makes an amount of data too large to make use of limited memory effectively. It should be noted that the sign "•" in FIG. 1 represents a Chinese character, omitted for convenience in description.

Figure 2:
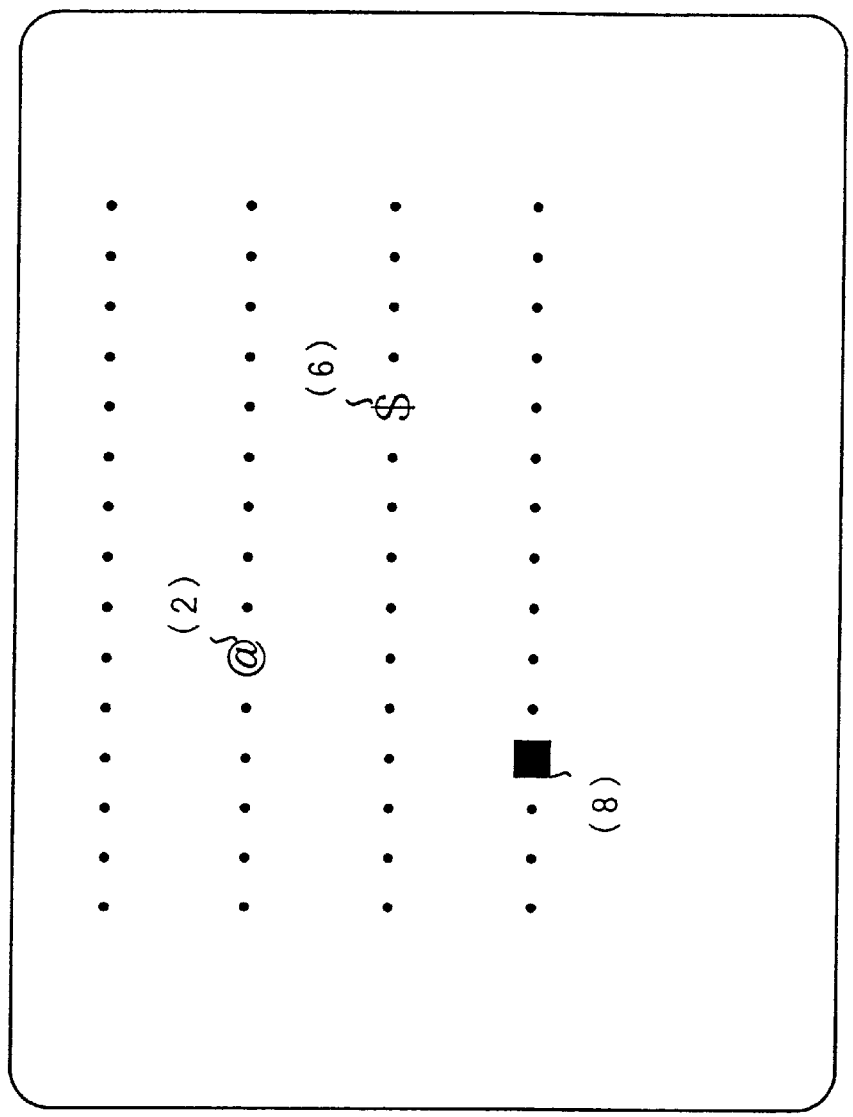
FIG. 2 is an explanatory view showing an example of a screen in a character processing apparatus not providing therein some portion of character and the corresponding fonts.

FIG. 2 is an explanatory view showing one of examples of a screen display in any ordinary character processing apparatus not providing therein some portion of character codes and the corresponding fonts. For instance, in any character processing apparatus not having character codes and the corresponding fonts other than Character (1), Character (5), and Character (7), when each character code of Character (2), Character (6), and Character (8) is inputted, each of the characters is garbled as shown in FIG. 2 (or is not displayed at all). As described above, decreasing, without any consideration on this matter, the number of character codes and the corresponding fonts stored in a character processing apparatus causes characters to be garbled. Although an amount of memory to be used can be reduced, the text information cannot effectively be made use of.

For this reason, in the present invention, character groups specified in the UCS are classified as shown in FIG. 3. Namely, the character groups specified in the UCS are classified into groups comprising characters in such a relationship that each character in the group is pronounced the same and also has the same meaning but may have fonts different from each other. A character with a font which is generally used in a group is designated as a representative character representing the group. For instance, among Character (1) to Character (4) shown in Table 1, there is a relationship that each character is pronounced the same and has the same meaning as the others, but only the fonts are different from each other. And for this reason, these characters are classified to the same group as shown in FIG. 3. Since Character (1) is the most generally used of those characters, it is designated as a representative character in the group. Then, a group number for discriminating from other groups is assigned to each group. For instance, the group of Character (1) to Character (4) is assigned a group number of "1349". It should be noted that Character (5) and Character (6) shown in Table 1 are classified to the same group, although it is not shown in FIG. 3, and Character (5) is designed as a representative character therein. Also, Character (7) and Character (8) are classified to the same group and Character (7) is designated as a representative character therein. Included in each group shown in FIG. 3 are not only those Chinese characters that are used in the Japanese language but also those used in the Chinese language as variant font characters. However, any character which is not pronounced the same and have the same meaning as any other character assigned to a group to which only that character belongs.

Stored in the character processing apparatus according to the present invention are character codes for representative characters as well as for variant font characters. Fonts corresponding to the character codes for at least the representative characters according to the classification shown in FIG. 3 are also stored. When the character processing apparatus according to the present invention receives, not a character code for any representative character, but a character code for a variant font character, the font for the representative character of the same group as that of the received variant font character is displayed on a screen. Namely, the character actually displayed on the screen is not a variant font character but the representative character in the same group.

Figure 4:
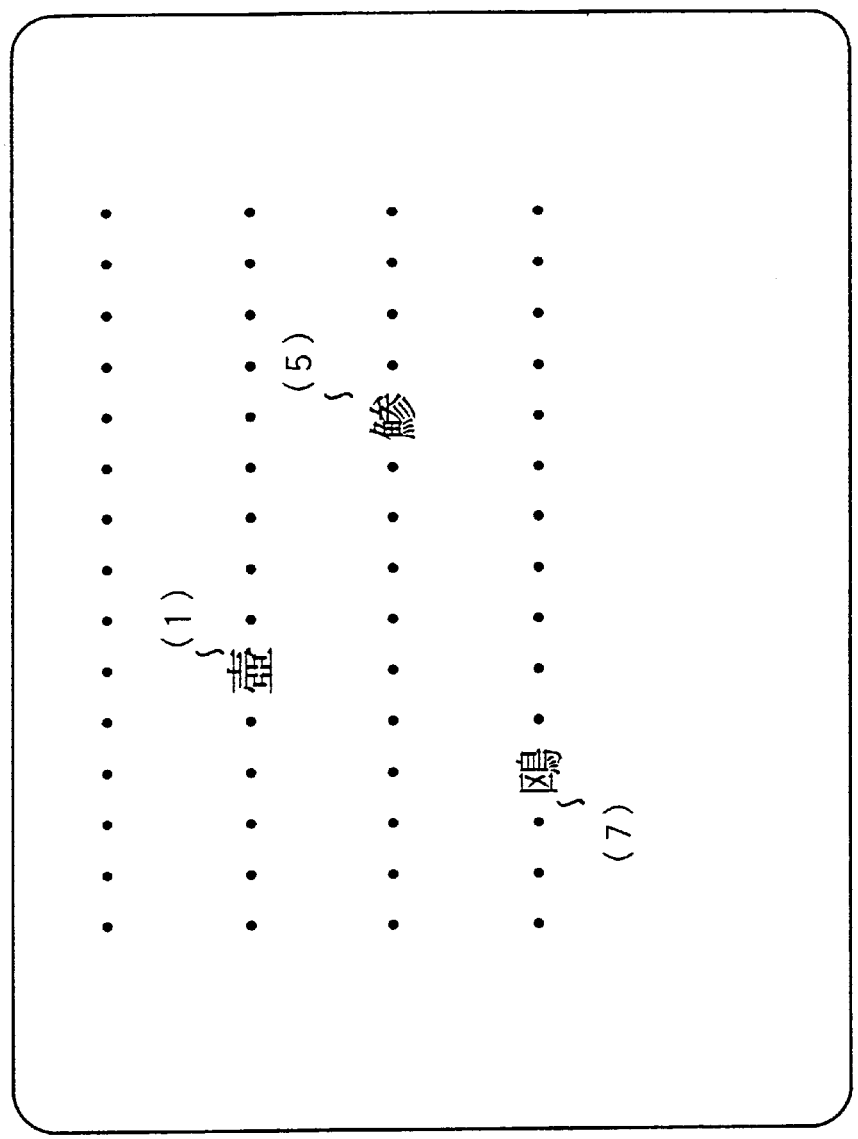
FIG. 4 is an explanatory view showing an example of a screen display in the character processing apparatus according to the present invention.

FIG. 4 is an explanatory view showing one of examples of the screen display in the character processing apparatus according to the present invention. For instance, when the character processing apparatus according to the present invention receives character code for Character (2), the font corresponding to the character code for Character (1) is displayed for Character (2). Namely, as shown in FIG. 4, the character actually displayed on the screen is not Character (2), but Character (1). Similarly, when the apparatus receives character code for Character (6) and Character (8), Character (5) and Character (7), the respective representative characters in each group, are displayed on the screen as shown in FIG. 4.

Then, description is made concretely for embodiments of the present invention.

Figure 5:
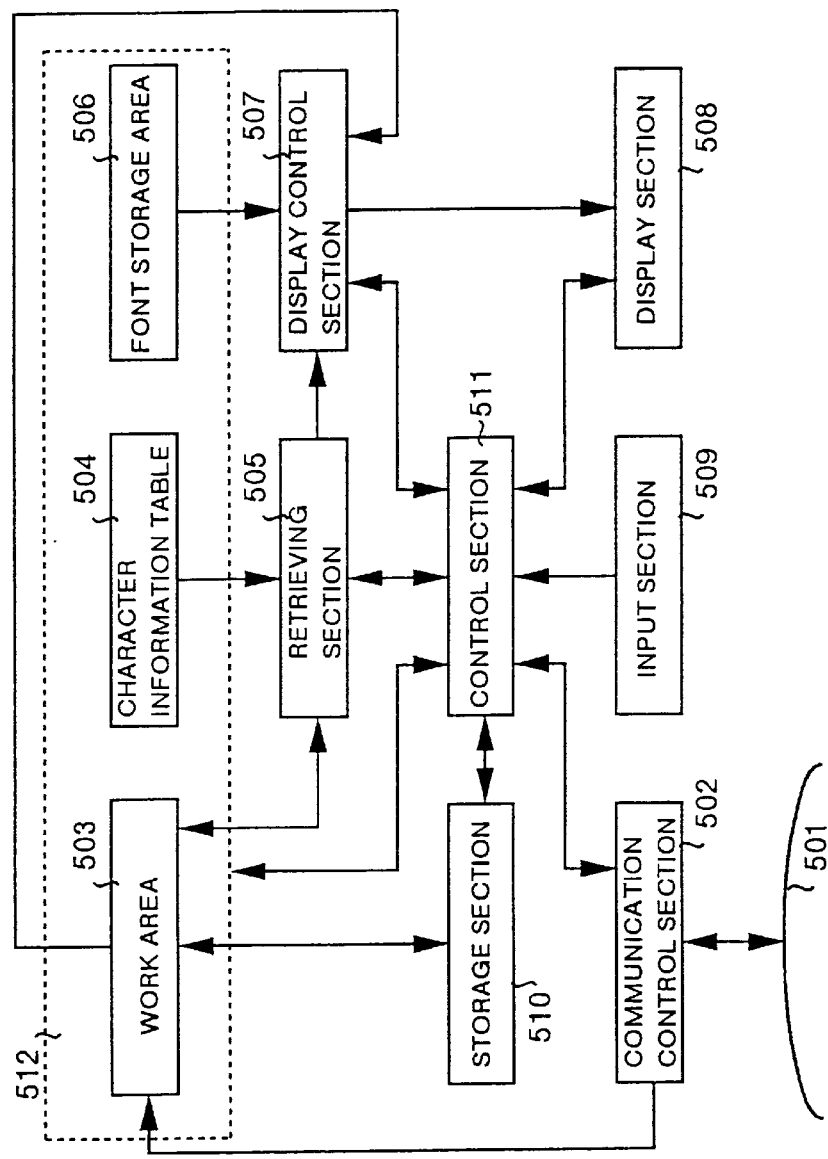
FIG. 5 is a block diagram showing a character processing apparatus according to Embodiment 1 of the present invention.

FIG. 5 is a block diagram showing a character processing apparatus according to Embodiment 1. The character processing apparatus according to Embodiment 1, connected to a network 501 such as the Internet or a LAN or the like, comprises a communication control section 502 for controlling data communication through the network 501; a work area 503 developed in a temporary storage section 512 such as a RAM or the like for storing therein character code received by the communication control section 502; a retrieving section 505 for receiving an arbitrary character code from the work area 503, referring to a character information table 504 developed in the temporary storage section 512, and outputting storage address information for the font corresponding to the received character code; a display control section 507 for receiving the storage address information from the retrieving section 505, receiving the corresponding font from a font storage area 506 developed in the temporary storage section 512, and controlling a screen display of a character corresponding to the arbitrary character code; a display section 508 for displaying the character corresponding to the arbitrary character code on the screen according to control by the display control section 507; an input section 509 for inputting therein any specified command or any characters or the like; a storage section 510 for storing therein character code stored in the work area 503 according to the command inputted from the input section 509; and a control section 511 for controlling each of the sections.

In FIG. 5, the font storage area 506 stores therein, as described in the outline of the present invention, at least the fonts corresponding to character codes for the representative characters in each group among character groups (Refer to FIG. 3) obtained by classifying the characters into groups of representative characters as well as variant font characters. The font storage area 506 stores therein, for instance, fonts corresponding to character code for Character (1), Character (5), and Character (7) in Table 1.

FIG. 6 is an explanatory view showing configuration of the character information table 504 in the character processing apparatus according to Embodiment 1. The character information table 504 stores character codes for the character groups classified as shown in FIG. 3 within the actual character processing apparatus. Namely, the character information table 504 comprises a character code area 601 for storing therein a character code for each character code specified in the UCS; a storage address information area 602 for storing therein storage address information when any font corresponding to the required character code is stored in the font storage area 506 and storing therein no-font information, namely not storing therein storage address information, when a font corresponding to the required character code is not stored in the font storage area 506; a type information area 603 for storing therein type information indicating a type as to whether the corresponding character code is a representative character or a variant font character; and a group information area 604 for storing therein group information indicating group numbers each of the corresponding character codes among the group numbers (Refer to FIG. 3) assigned by classifying all the character codes into groups each comprising a representative character and variant font characters thereof.

In FIG. 6, as for Character (1) in Table 1, for instance, 58FA which is the character code thereof is stored in the character code area 601. Then, storage address information for the font storage area 506 is stored in the storage address information area 602 corresponding to the character code (58FA). Character (1) is a representative character, so that type information indicating that fact is stored in the corresponding type information area 603, and which is a group number shown in FIG. 3 is stored in the corresponding group information area 604. On the other hand, for Character (2), 58F6 which is the character code thereof is stored in the character code area 601. However, Character (2) is the variant font character of the character code (1), so that the storage address information is not stored in the corresponding storage address information area 602, and the type information indicating that fact is stored in the corresponding type information area 603. Also Character (2) belongs to the same group as Character (1) (Refer to FIG. 3), so that 1349, which is the same group number as that of Character (1), is stored in the corresponding group information area 604.

It should be noted that, in FIG. 6, the storage address information shown in the storage address information area 602 is only an example, which does not indicate actual storage address information in the font storage area 506. Also, one of three Chinese characters which means a representative character and one of three Chinese characters which means the variant font character thereof are used in the specification in Japanese for convenience in description, but actually, the reference numerals "1" and "0" corresponding to the characters are used respectively. Also, the depicted group numbers in the group information area 604 are only an example, because any arbitrary number can be set therein.

In FIG. 5, the retrieving section 505 receives the arbitrary character code stored in the work area 503. The matching character code from the character information table 504 is retrieved according to the received character code, referring to the storage address information or no-font information (in a case where any storage address information is not stored therein) corresponding to the retrieved character code. When the storage address information exists therein, the corresponding storage address information is outputted. On the other hand, when the no-font information exists therein, the character code of which a group number is the same as that of the retrieved character code and type information indicates character code for a representative character according to the type information and group information are retrieved to output the storage address information for the corresponding character code. Namely, the retrieving section 505 outputs a storage address of the font corresponding to the character code of the representative character in the same group when the received arbitrary a character code is character code for the variant font character with the font not stored therein.

The retrieving section 505 outputs storage address information as well as a command for changing only a display of the corresponding character code when retrieving the character code corresponding to the received arbitrary character code results in the fact that the storage address information corresponding to the retrieved character code is not stored therein and character code for the representative character is retrieved and the storage address information for the corresponding character code is to be outputted. In addition, the retrieving section 505 stores, in the same case as described above, the character code for the representative character correlated with the corresponding arbitrary character code (character code for the variant font character thereof) in the work area 503. With this feature, it is clear that any variant font character with no font corresponding thereto and which cannot be displayed on the screen is displayed thereon using the font for the representative character thereof, and it is also possible to replace the character code for the received variant font character with the character code for the representative character.

The display control section 507 receives the corresponding font from the font storage area 506 according to the storage address information received from the retrieving section 505, and displays the font corresponding to the received arbitrary character code on the screen. Also, the display control section 507 displays thereon, when it has received the storage address information and the display change command, such indication that screen display was executed using a font corresponding to character code for the representative character, not using the font corresponding to the received arbitrary character code (character code for the variant font character). In this case, characters are changed in color for display or the like when the font corresponding to the required character code is displayed on the screen (Refer to FIG. 8).

The control section 511 can replace, when the character code for the character displayed on the screen according to instruction from the input section 509 is to be stored in the storage section 510, the character code with no corresponding font (character code for the variant font character) with the character code for the representative character to store it in the storage section 510. As described above, when the font corresponding to the character code for the representative character is displayed on the screen as the received arbitrary character code (character code for the variant font character), the retrieving section 505 stores the character code for the representative character correlated with the arbitrary character code in the work area 503. The control section 511 replaces the corresponding character code (character code for the variant font character) with the character code for the representative character stored in the work area 503 according to instruction from the input section 509.

It should be noted that, in the configuration as described above, each processing in the retrieving section 505 as well as in the display control section 507 is realized as a character processing program which is executed by a CPU to function as described above. The control section 511 corresponds to the CPU in this case. Also, the display section 508 comprises a display unit such as a CRT or the like, the input section 509 comprises a keyboard or a mouse or the like, and further the storage section 510 comprises a recording medium such as a hard disk and a floppy disk or the like.

Next, a character processing method according to Embodiment 1 is described. It should be noted that description is made separately by hereinafter for (A) the case where an arbitrary character code is inputted and a font corresponding thereto is displayed on the screen, and for (B) the case where the text displayed on the screen is to be stored.

Figure 7:
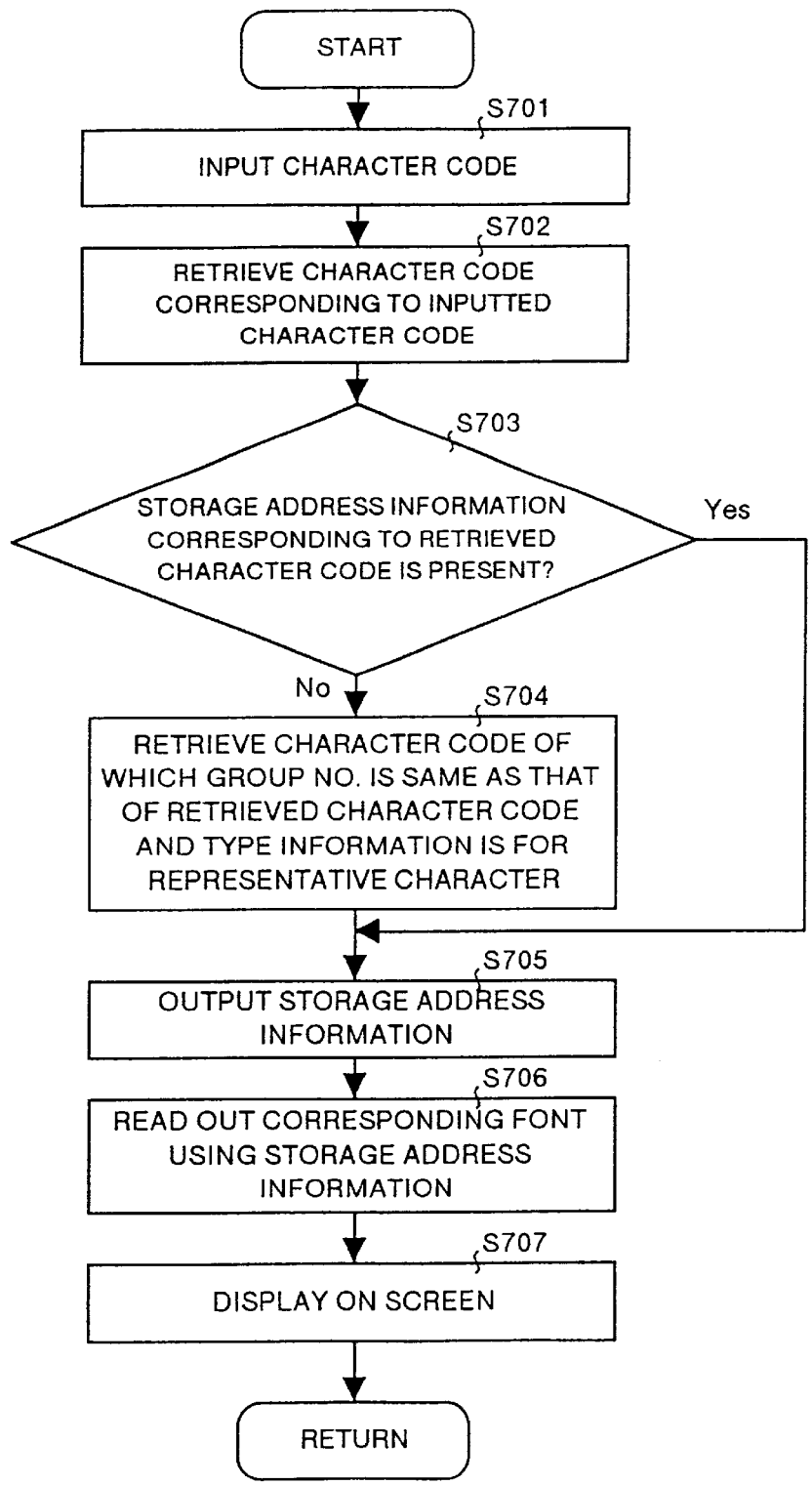
FIG. 7 is a flow chart showing a character processing method according to Embodiment 1 of the present invention.

(A) The case where an arbitrary character code is inputted and a font corresponding thereto is displayed on a screen FIG. 7 is a flow chart showing the character processing method according to Embodiment 1, in which an arbitrary character code is inputted and a font corresponding thereto is displayed on a screen. The character processing method shown in FIG. 7 is described herein in the order of (1) processing a character code for a representative character and (2) processing a character code for the variant font character thereof. It should be noted that the description of the character processing method assumes that one unit of character code is used for convenience in description for the present invention although a plurality of character codes are processed in the actual processing.

(1) Processing a character code for a representative character

The communication control section 502, at first, receives arbitrary character code through the network 501 and stores the received character code in the work area 503. Then, the retrieving section 505 receives arbitrary character code from the work area 503 (S701).

Herein, it is assumed that the retrieving section 505 has received the character code (58FA: representative character) for Character (1). The retrieving section 505 retrieves the matching character code (58FA) from the character code area 601 in the character information table 504 shown in FIG. 6 according to the received character code (58FA) (S702).

Then, the retrieving section 505 refers to the storage address information area 602 corresponding to the retrieved character code (58FA) (S703).

In FIG. 6, as a result of referring to the storage address information area 602 corresponding to the retrieved character code (58FA), the retrieving section 505 recognizes that the storage address information for the font corresponding to the retrieved character code (58FA) is stored therein. For this reason, the retrieving section 505 goes to step S705 and outputs the corresponding storage address information to the display control section 507.

The display control section 507 receives the storage address information from the retrieving section 505 and reads out the corresponding font from the font storage area 506 using the received storage address information (S706).

Then, the display control section 507 displays a character (Character (1)) corresponding to the arbitrary character code (58FA) on the screen by controlling the display section 508 (S707). As a result, Character (1) is displayed on the screen as shown in FIG. 4.

(2) Processing a character code for a variant font character

The case is described in which a character code for a variant font character is processed.

The retrieving section 505 receives an arbitrary character code from the work area 503 (S701).

Herein, it is assumed that the retrieving section 505 has received character code (58F6: variant font character) for Character (2). The retrieving section 505 retrieves the matching character code (58F6) from the character code area 601 in the character information table 504 shown in FIG. 6 according to the received character code (58F6) (S702).

Then, the retrieving section 505 refers to the storage address information area 602 corresponding to the retrieved character code (58F6) (S703).

In FIG. 6, as a result of referring to the storage address information area 602 corresponding to the retrieved character code (58F6), the retrieving section 505 recognizes that the storage address information for the font corresponding to the retrieved character code (58F6) is not stored therein (no-font information exists therein). Then, the retrieving section 505 retrieves character code of which a group number (1349) is the same as that of the retrieved character code (58F6) and type information indicates character code for a representative character according to the type information stored in the type information area 603 as well as to the group numbers stored in the group information area 604 (S704). In this case, character code of which a group number (1349) is the same as that of the retrieved character code (58F6) and type information indicates character code for the representative character is the character code (58FA) for Character (1).

Then, the retrieving section 505 outputs the storage address information corresponding to the character code (58FA) retrieved in step S704 to the display control section 507 (S705).

It should be noted that, in step S705, the retrieving section 505 can output a command for display change, together with the storage address information, for commanding the display control section 507 to execute such processing that color of the displayed character is changed or the like With the operation as described above, the display control section 507 can display, when the corresponding character code is displayed on the screen, the fact that the character displayed on the screen is a representative character for a variant font character. However, the processing described above can freely be configured according to the command issued by the user.

The display control section 507 receives the storage address information from the retrieving section 505 and reads out the corresponding font from the font storage area 506 using the received storage address information (S706).

Then, the display control section 507 displays a character corresponding to the arbitrary character code (58F6) on the screen by controlling the display section 508 (S707). As a result, Character (1) as the representative character is displayed on the screen, as shown in FIG. 4, in place of the character (Character (2) as the variant font character thereof) corresponding to the arbitrary character code (58F6).

Figure 8:
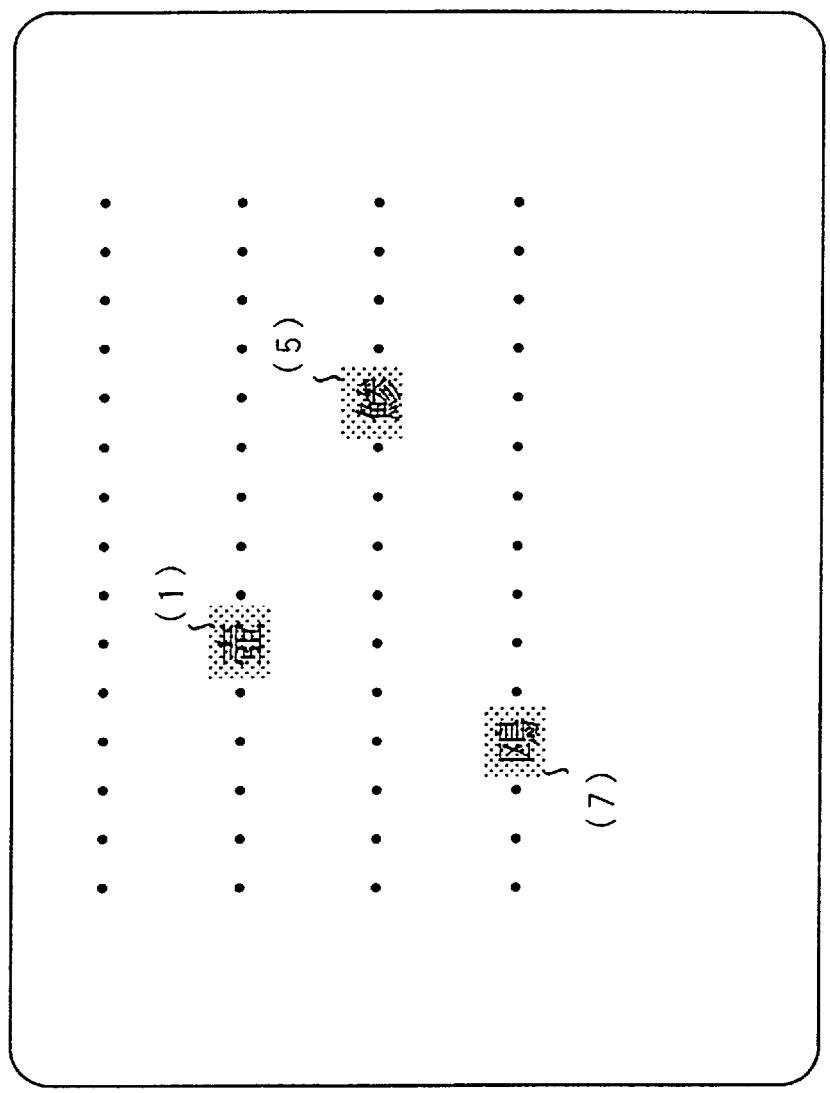
FIG. 8 is an explanatory view showing an example of a screen display of character code for a variant font character in the character processing method according to Embodiment 1 of the present invention.

It should be noted that, in step S706, the display control section 507 displays, when a font corresponding to the character code is displayed on the screen in a case where the display control section 507 receives the storage address information as well as the display change command, the character, for instance, changed in color or that in reverse black-and-white as shown in FIG. 8.

(B) The case where a text displayed on the screen is to stored

Figure 9:
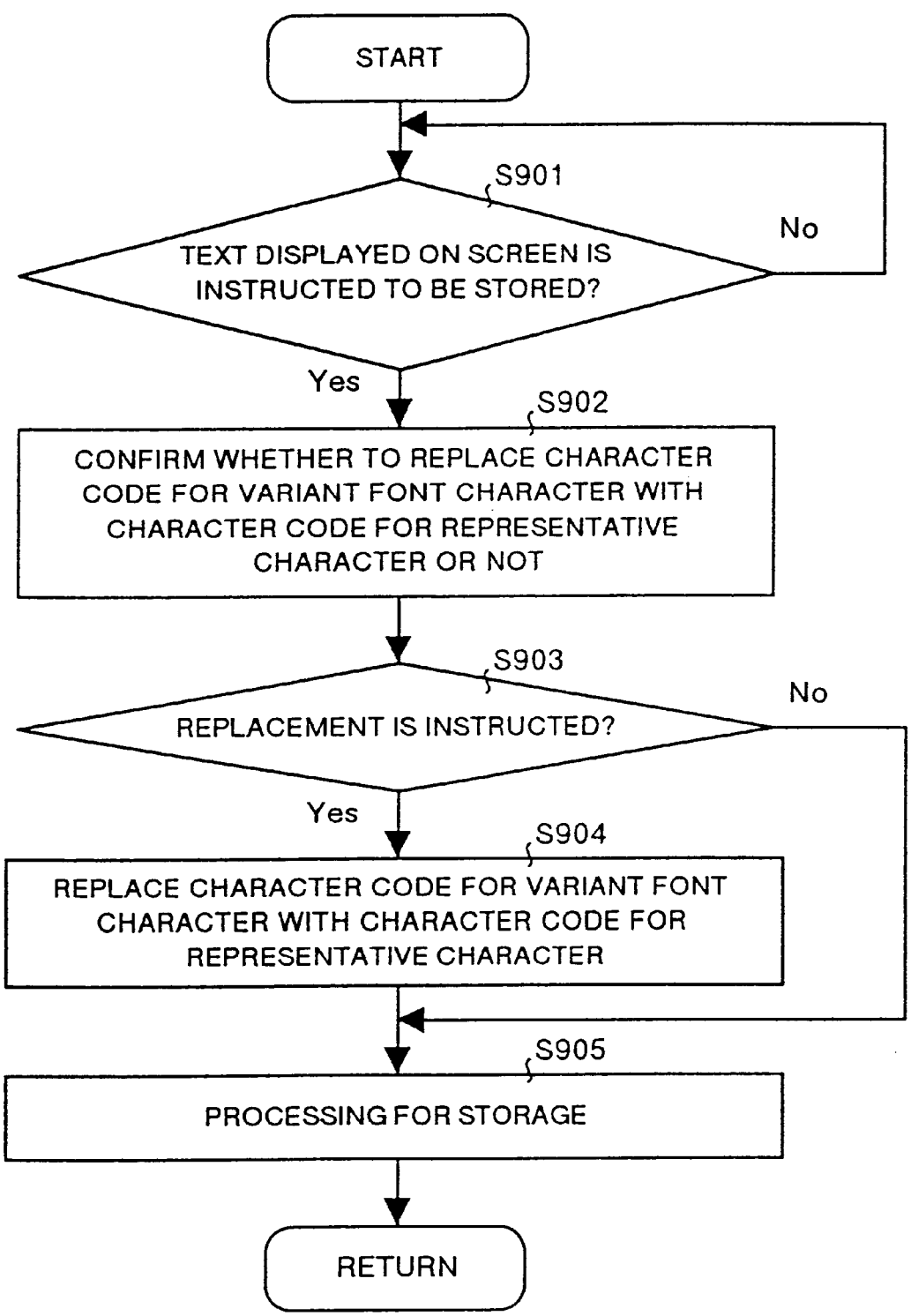
FIG. 9 is a flow chart showing the character processing method according to Embodiment 1.

A specified text is displayed on the display section 508 by successively receiving the constituent, arbitrary character codes and repeatedly executing the character processing method shown in FIG. 7. Herein, processing when the text is stored in the storage section 510 is described. FIG. 9 is a flow chart showing the character processing method according to Embodiment 1, for the case where the text displayed on the screen is stored therein. It should be noted that description herein assumes that the character code (58F6) for Character (2) stored in the work area 503 is stored in the storage section 510.

Although the description was not made in the "(A) the case where an arbitrary character code is inputted and a font corresponding thereto is displayed on the screen", in step S705 shown in FIG. 7, it is assumed that the processing described below is previously executed. Namely, the retrieving section 505 reports, when the storage address information corresponding to the retrieved character code (58F6) is not stored therein, namely when the received arbitrary a character code is character code for a variant font character, that fact to the control section 511. The retrieving section 505 concurrently outputs the character code of which a group number is the same as that of the retrieved character code (58F6) and type information indicates character code for a representative character to the work area 503. Then, the control section 511 stores the character code (58FA) for a representative character outputted from the retrieving section 505 correlated with the corresponding character code (58F6) in the work area 503.

After the processing described above is executed, the character processing method shown in FIG. 9 is performed. The control section 511 requests the user, when the text displayed on the screen is instructed to be stored from the input section 509 (S901), to instruct as to whether the character code for a variant font character is to be replaced with the character code for a representative character by displaying it on the screen or not (S902).

The control section 511 stores, when replacement of the character code is not instructed in step S903, the character code (58F6) for Character (2) stored in the work area 503 in the storage section 510 as it is (S904).

On the other hand, the control section 511 replaces, when replacement of the character code is instructed in step S903, the character code (58F6) for Character (2) with the character code (58FA) for Character (1) as the representative character previously stored in the work area 503 (S904).

The control section 511 performs replacement of the character code and stores the replaced character code (58FA) for Character (1) in the storage section 510 (S904).

As described above, the character code for a variant font character can be replaced with the character code for a representative character, so that the character code for a variant font character can be replaced with the character code for a representative character before being transmitted to another character processing apparatus, which makes it possible to prevent garbling characters or the like in the other character processing apparatus.

As described above, with the character processing apparatus and character processing method according to Embodiment 1, in a case where any variant font character of the font not stored in the apparatus is received, the representative character in the same group as that of the variant font character is displayed on the screen in place of the variant font character, so that it is possible to prevent any character from not being displayed thereon or from being garbled. In addition, the received character information is prevented from not being recognized and the contents thereof from being misunderstood due to influence of the character garbling or the like even when a variant font character of the font not stored in the apparatus is received. The amount of data stored can be reduced because only fonts corresponding to the character codes for at least the representative characters may be stored in the character processing apparatus, which makes it possible to make use of memory effectively.

Also included in the variant font characters are, for instance, Chinese characters in the Chinese language. For this reason, even when data written in the Chinese language is received through the Internet and is displayed on a Japanese language browser, it is possible to prevent any Chinese character from being garbled, and for this reason, it is extremely effective when character information is exchanged through the Internet or the like.

Furthermore, in the character processing apparatus and character processing method according to Embodiment 1, when where any variant font character of the font not stored in the apparatus is received, a font is displayed on the screen by replacing the variant font character with the representative character in the same group as that of the variant font character. However, only the character shapes is different between the variant font character and the representative character in this case, and the pronunciation and the meaning in the variant font character are the same as those in the representative character, so that any text written in difficult variant font characters can be replaced with simplified representative characters each in the same group as that of the variant font character. Accordingly, the character processing apparatus and character processing method according to Embodiment 1 have an advantage in that any character information written in traditional Chinese characters can be converted to character information written in simplified Chinese characters when they are to be inputted.

Figure 10:
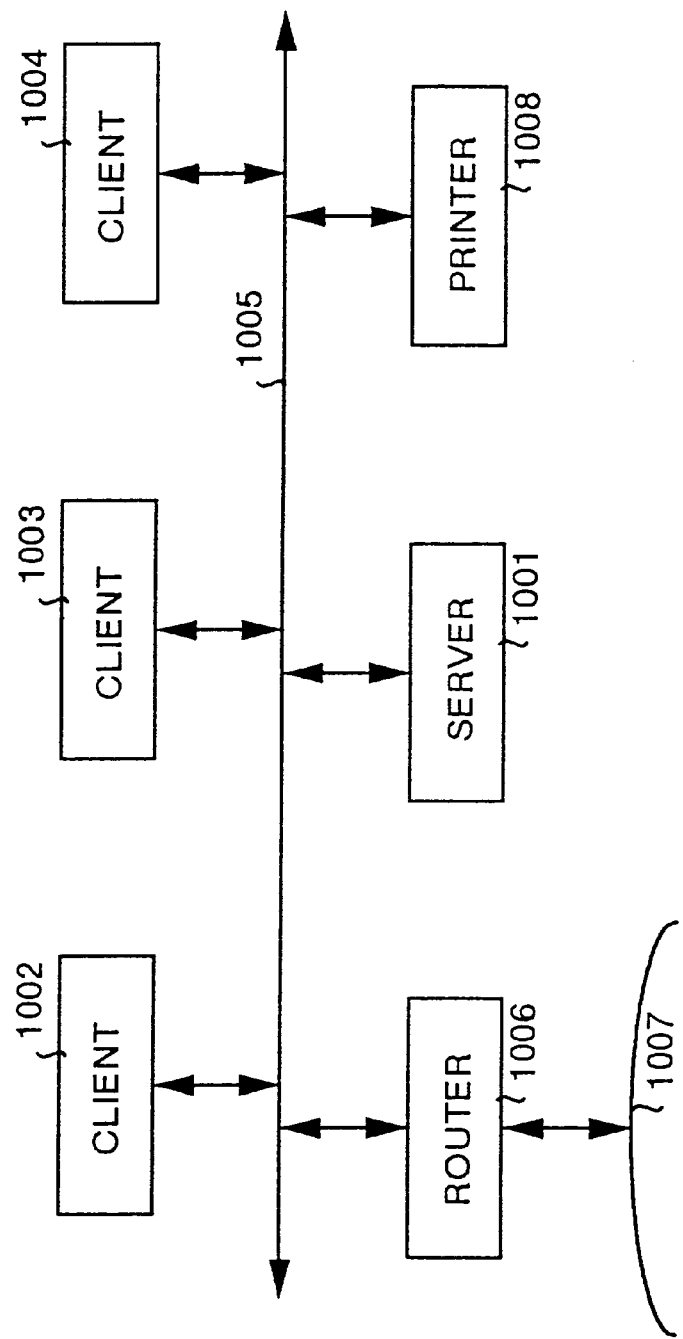
FIG. 10 is a block diagram showing the general configuration of a character processing system according to Embodiment 2 of the present invention.

Next description is made for a character processing system according to Embodiment 2. FIG. 10 is a block diagram showing general configuration of the character processing system according to Embodiment 2. The character processing system according to Embodiment 2 comprises a server 1001 and a plurality of clients 1002 to 1004 connected to each other through a network 1005 such as a LAN or the like. It should be noted that this network 1005 can be connected to any other network 1007 such as the Internet or the like through a router 1006. A printer 1008 or the like can also be connected to the network 1005.

The character processing system according to Embodiment 2 can be realized by using at least two units of apparatus. So, description is made for the character processing system according to Embodiment 2 using the server 1001 and the client 1002 for convenience in description. However, the character processing system according to Embodiment 2 is not restricted to a server and a client.

Figure 11:
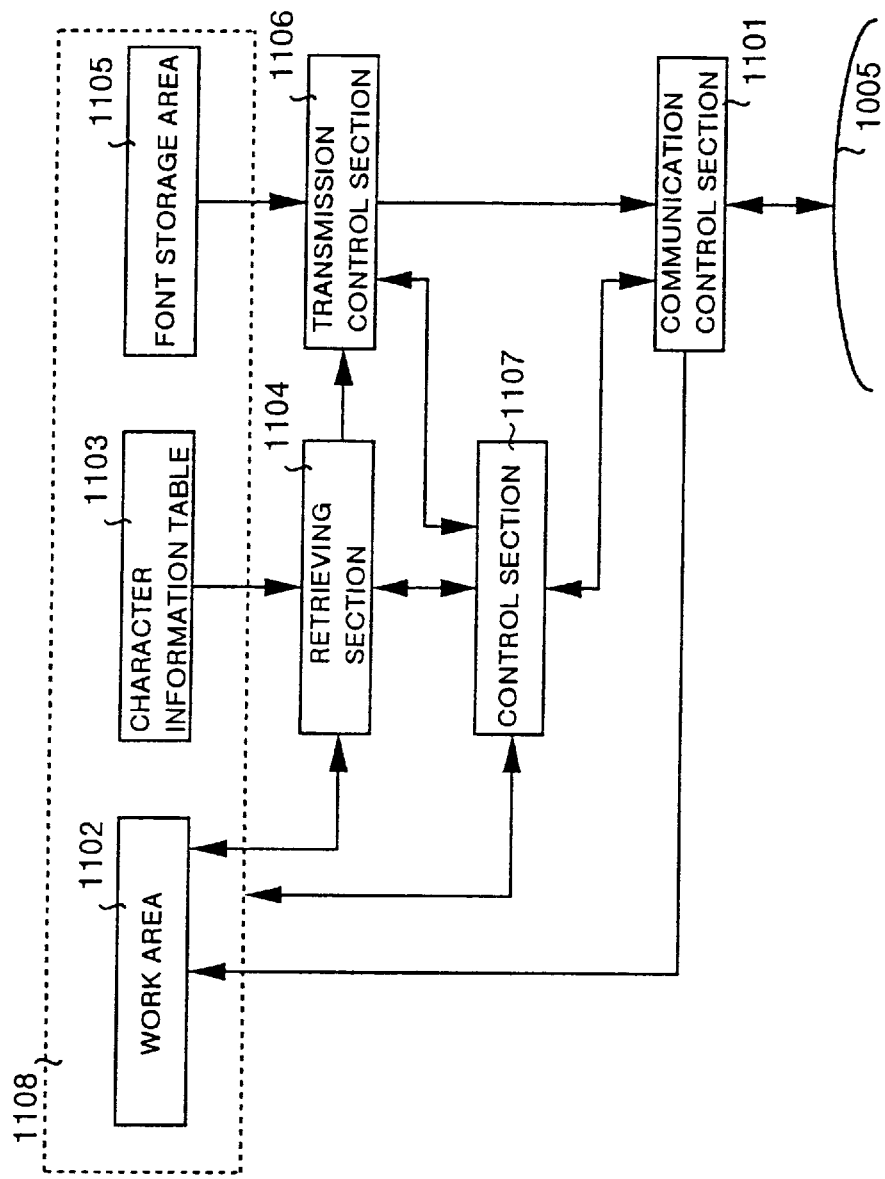
FIG. 11 is a block diagram showing the general configuration of a server in the character processing system according to Embodiment 2 of the present invention.

FIG. 11 is a block diagram showing general configuration of the server 1001 in the character processing system according to Embodiment 2. The server 1001 comprises a communication control section 1101 for controlling data communication through the network 1005 and receiving character codes from the client 1002; a work area 1102 developed in a temporary storage section 1108 such as a RAM or the like for storing character codes received from the communication control section 1101; a retrieving section 1104 for receiving character codes from the work area 1102, referring to a character information table 1103 developed in the temporary storage section 1108, and outputting storage address information for a font corresponding to the received character code; a transmission control section 1106 for receiving the storage address information from the retrieving section 1104, receiving the corresponding font from a font storage area 1105 developed in the temporary storage section 1108, and transmitting the corresponding font to the client 1002 through the communication control section 1101; and a control section 1107 for controlling each of the sections.

In FIG. 11, the font storage area 1105 stores therein, different from the font storage area 506 in the character processing apparatus according to Embodiment 1, all of the fonts corresponding to character code for character groups each obtained by classifying the characters into groups for representative characters as well as those for variant font characters.

As the character information table 1103, a table having the same configuration as that of the character information table 504 shown in FIG. 6 is used. However, all of the fonts is stored in the font storage area 1105, consequently, storage address information corresponding to all the character codes for the character code area 601 is stored in the storage address information area 602 of the character information table 1103.

The retrieving section 1104 receives the character code stored once in the work area 1102, retrieves the matching character code from the character information table 1103 according to the received character code, refers to the storage address information corresponding to the retrieved character code, and outputs the storage address information.

The transmission control section 1106 receives the corresponding font from the font storage area 1105 according to the storage address information from the retrieving section 1104 and outputs the font corresponding to the required character code to the client 1002 through the communication control section 1101.

It should be noted that, in the configuration described above, the processing in the retrieving section 1104 as well as in the transmission control section 1106 is realized as a character processing program which is executed by the CPU to function as described above. The control section 1107 corresponds to the CPU in this case.

Also the character processing apparatus according to Embodiment 1 is used for the client 1002. Accordingly, the configuration of the client 1002 is the same as that already described with reference to FIG. 5 and FIG. 6, so that description thereof is omitted herein. However, the client 1002 transmits, the received character code to the server 1001, when a character code for any font not stored in the apparatus is received, and receives the corresponding font from the server 1001 to display the font corresponding to the required character code on the screen.

The character processing method according to Embodiment 2 is described. It should be noted that description is made separately hereinafter for (A) processing when a character code is inputted and a font corresponding thereto is displayed on the screen, and for (B) processing after displaying it on the screen.

Figure 12:
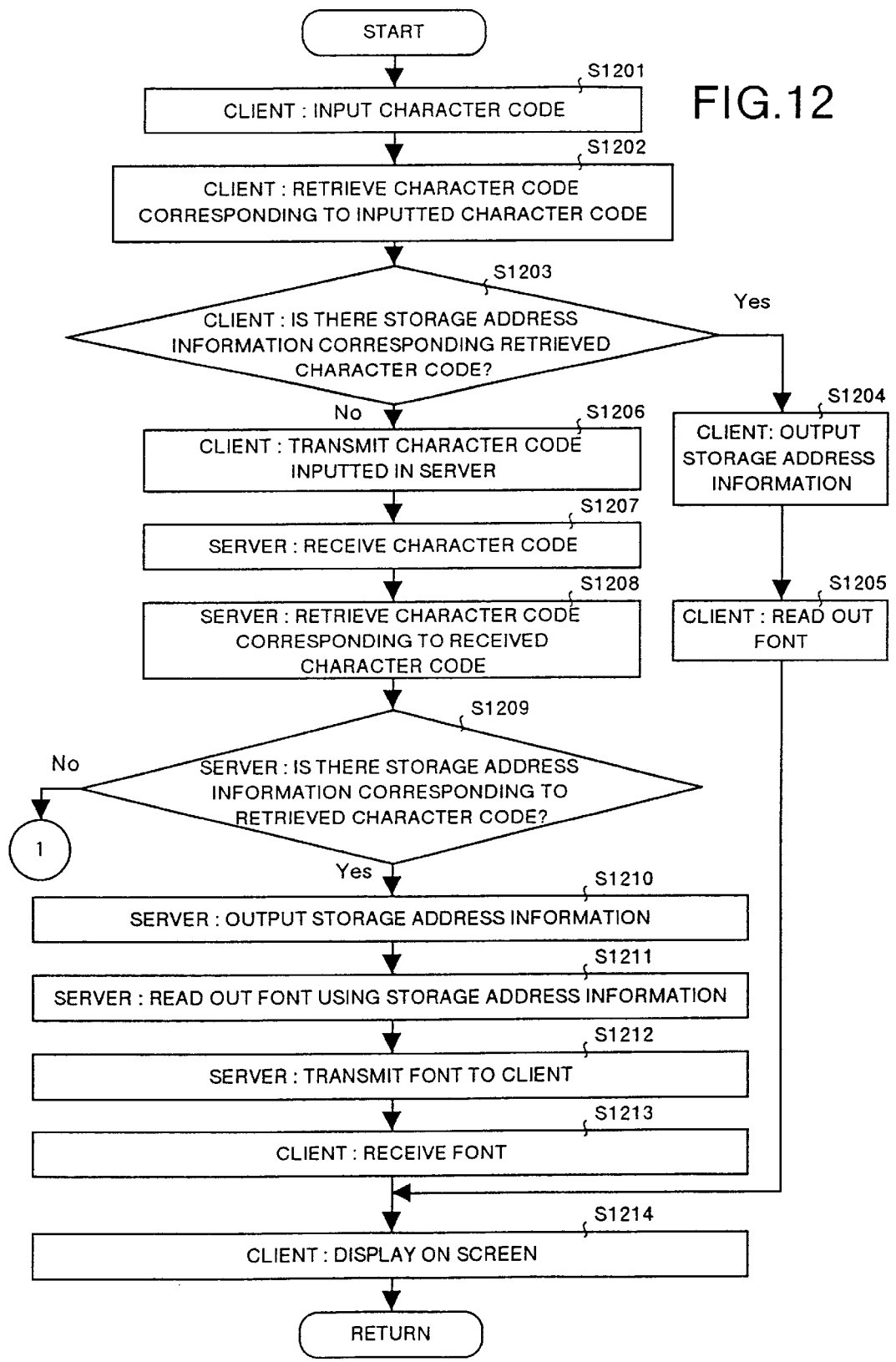
FIG. 12 is a flow chart showing the character processing method according to Embodiment 2 of the present invention.
Figure 13:
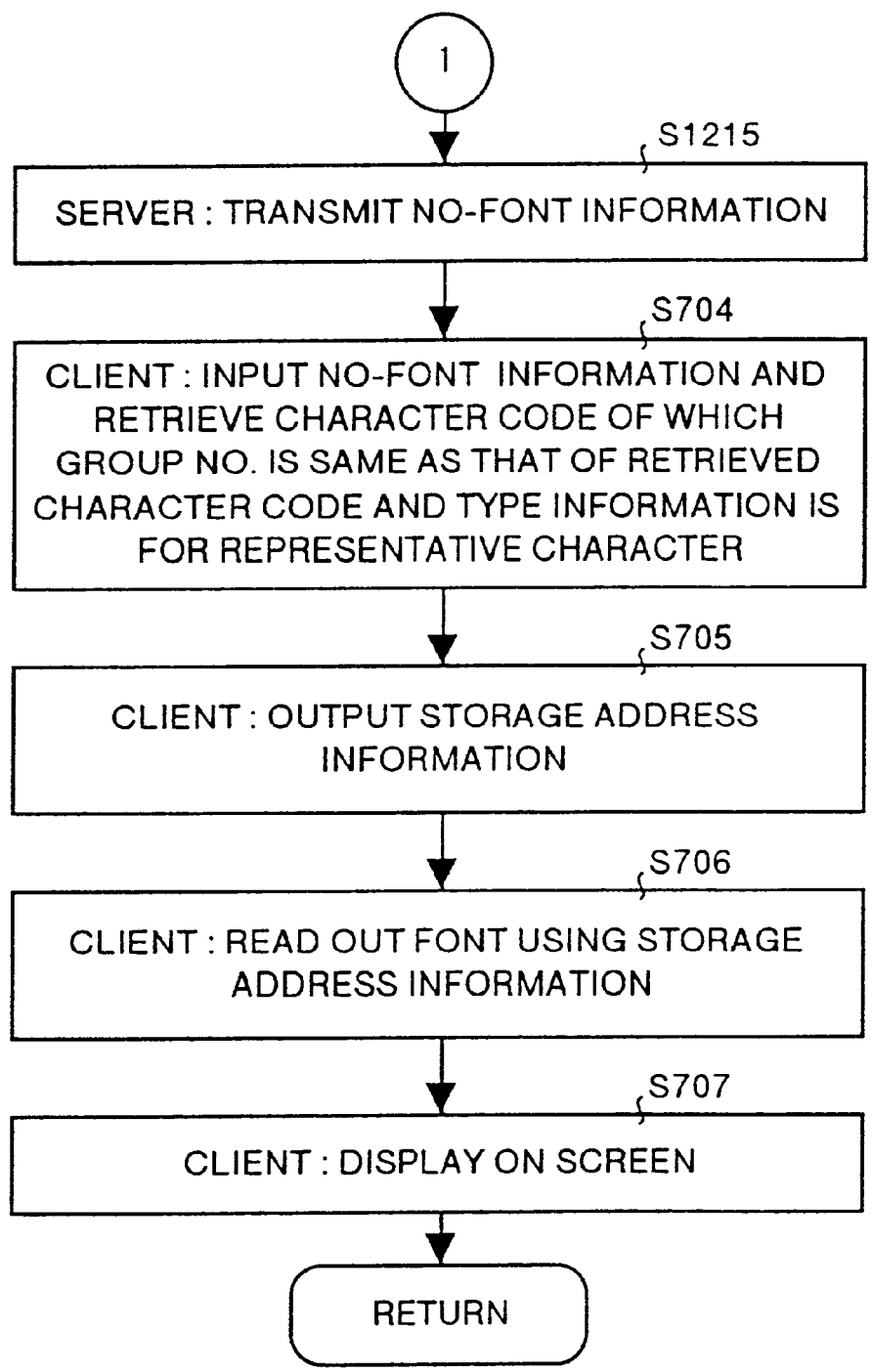
FIG. 13 is a flow chart showing the character processing method according to Embodiment 2 of the present invention.

(A) Processing when a character code is inputted and a font corresponding thereto displayed on a screen FIG. 12 and FIG. 13 are flow charts each showing the character processing method according to Embodiment 2 of the present invention, when a character code is inputted and a font corresponding thereto is displayed on a screen. The character processing methods shown in FIG. 12 and FIG. 13 are described in the order of (1) a case of character code for a representative character, and (2) a case of a character code for a variant font character.

(1) Processing in a case of a character code for a representative character

The communication control section 502 in the client 1002 receives a character code and stores the inputted character code in the work area 503. Then, the retrieving section 505 in the client 1002 receives a character code from the work area 503 (S1201).

Herein, it is assumed that the retrieving section 505 received the character code for character (1) (58FA: representative character). Based on the received character code (58FA), the retrieving section 505 retrieves the matching character code (58FA) in the character code area 601 in the character information table 504 shown in FIG. 6 (S1202).

Then the retrieving section 505 refers to the storage address information area 602 corresponding to the retrieved character code (S1203).

In FIG. 6, the storage address information area 602 corresponding to the retrieved character code (58FA) is referred to stores font storage address information for the retrieved character code (58FA). So, the retrieving section 505 shifts processing to step S1204, and outputs the corresponding storage address information to the display control section 507.

The display control section 507 receives storage address information from the retrieving section 505 and reads out the corresponding font from the font storage area 506 using the inputted storage address information (S1205).

Then, the display control section 507 controls the display section 508 to display the arbitrary character code (58FA) on a screen (S1214). As a result, as shown in FIG. 4, the character (1) is displayed on the screen.

As described above, when a character code received by the client 1002 is that for a font stored in the device, namely when the received character code is that for a representative character, the client 1002 itself can display the character corresponding to the received character code on the screen.

(2) Processing in a case of a character code for a variant font character

Next description is made for a case where the client 1002 displays a character corresponding to character code for a variant font character. At first, the client 1002 executes the character processing method shown in FIG. 12.

The retrieving section 505 receives given character code from the work area 503 (S1201).

Herein, it is assumed that the retrieving section 505 received character code for the character (2) (58F6: Variant font character). According to the received character code (58F6), the retrieving section 505 retrieves matching character code (58F6) from the character code area 601 in the character information table 504 shown in FIG. 6 (S1202).

Then, the retrieving section 505 refers to the storage address information area 602 corresponding to the retrieved character code (S1203).

In FIG. 6, the storage address information area 602 corresponding to the retrieved character code (58F6) is referred to does not storage address information for a font corresponding to the retrieved character code (58F6) (there exists no-font information). So the retrieving section 505 reports to the control section 511 that the corresponding storage address information has not been stored, namely that the character is for a character having a font not stored in the device, and the control section 511 transmits the character code for a character having a font not stored in the device from the communication control section 502 to the server 1001 (S1206).

Then the server 1001 executes a succession of steps of the character processing method shown in FIG. 12. The communication control section 1101 in the server 1001 receives the character code from the client 1002 and stored the character code in the work area 1102 (S1207).

The retrieving section 1104 in the server 1001 receives character code (58F6) from the work area 1102, and retrieves matching character code (58F6) from the character code area 601 in the character information table 1103 shown in FIG. 6 according to the received character code (58F6) (S1208).

Then the retrieving section 1104 refers to the storage address information corresponding to the retrieved character code (S1208).

As described above, all fonts are stored in the font storage area 1105 in the server 1001, and also all storage address information is stored in the storage address information area 602 in the character information table 1103. For this reason, the retrieving section 1104 outputs the corresponding storage address information to the transmission control section 1106 (S1210).

The transmission control section 1106 receives storage address information from the retrieving section 1104, and reads out a corresponding font from the font storage area 1105 using the received storage address information (S1211).

Then, the transmission control section 1106 outputs the corresponding font to the communication control section 1101, and the communication control section 1101 receives the corresponding font from the transmission control section 1106 and transmits the font to the client 1002 (S1212).

Herein, the client 1002 again executes the character processing method shown in FIG. 12. The communication control section 502 in the client 1002 receives the font from the server 1001, and outputs the received font to the work area 503 (S1213).

The display control section 507 receives the font from the work area 503 and displays a character corresponding to the received character code using the received font (S1214). As a result, as shown in FIG. 1, the character (2) is shown on the screen.

It should be noted that the control section 511 can store a font obtained from the server 1001 as described above in the font storage area 506 as needed. In this case, the control section 511 provides screen displays on the display section 508, and stores the font in the font storage area 506 as needed, for instance, by making the user decide whether the font is to be registered or not. After the font is stored in the font storage area 506, the control section 511 stores the storage address information in correlation to the corresponding character code in the storage address information area 602 in the character information table 504. Thus, by making it possible to add a new font, it is possible to newly add a font for a variant font character which may frequently be used but have a font not stored in the font storage area 506, and thus the processing for displaying a character corresponding to the received character code on a screen is made more efficient.

By the way, in the above description, it is assumed that all fonts are stored in the font storage area 1005 in the server 1001 shown in FIG. 11, but in a case where a portion of the fonts has not been stored in the font storage area 1105, there may occur a case where there is not storage address information corresponding to the character code retrieved in step S1209.

In the case as described above, the retrieving section 1104 in the server 1001 shifts processing to step S1215 in FIG. 13, and outputs no-font information, namely the information that there is no storage address information to the control section 1107. The control section 1107 receives this no-font information, and transmits the no-font information via the communication control section 1101 to the client 1002 (S1215).

Then, the client 1002 receives the no-font information, executes operations in steps S704 to S707, and displays a character corresponding to the character code having a font not stored in the device on a screen. It should be noted that the operations in the steps S704 to S707 are the same as those described in relation to FIG. 7 and description thereof is omitted herein.

In the above description, it is assumed that the client 1002 executes the operations in step S704 to S707 shown in FIG. 13 in a case where there is no corresponding font in the server 1001, but the operations may be executed not by the client 1002, but by the server 1001 to transmit the character code for a representative code to the client 1002. Further, the client 1002 may transmit the character code to other clients, when there is no corresponding font in the server 1001, to execute the character processing method shown in FIG. 12 and FIG. 13 with the other client.

(B) Processing after a character is displayed on a screen

Figure 14:
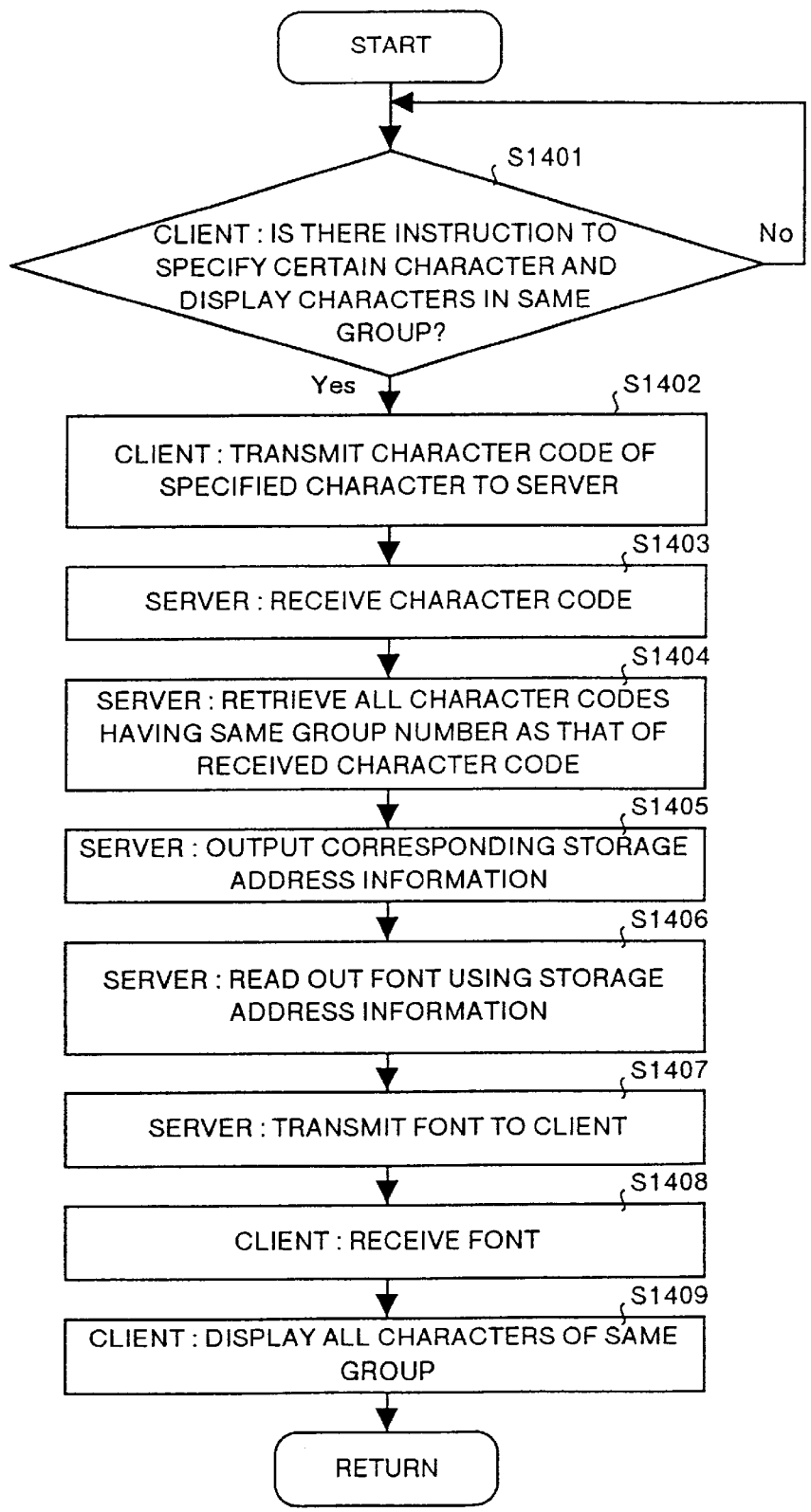
FIG. 14 is a flow chart showing the character processing method according to Embodiment 2 of the present invention.

FIG. 14 is a flow chart showing the character processing method according to Embodiment 2, when after a character is displayed on a screen. Herein described is the processing to convert, for instance, a character (2) displayed on the screen to another character belonging to the same group. The processing as described above is enabled because, even though a received variant font character can be displayed as it is, there is still a case where the variant font character is required to be changed to another character, or a case where the variant font character is required to be compulsorily changed to another variant font character. Also, it is convenient if a corresponding representative character can be displayed in a case where meaning of the displayed variant font character can not be understood.

For instance, it is assumed that the screen display as shown in FIG. 1 is provided on the display section 508 in the client 1002. When the character (2) is specified from the input section 509 and at the same time display of a character belonging to the same group as that of the character (2) is requested, character code for the specified character (2) is sent from the work area 503 to the communication control section 502, and the character code is transmitted to the server 1001 together with the font set request information for requesting transmission of a font corresponding to the character code having the same group number as the group number of this character code (S1401, S1402).

The communication control section 1101 in the server 1001 receives the character code from the client 1002 and stores the received character code in the work area 1102 (S1403). In this step, the control section 1107 in the server 1001 retrieves a character code having the same group number as the group number of the character code received by the retrieving section 1104 according to the font set request information received together with the character code, and issues an instruction for outputting the character code to the corresponding storage address information.

The retrieving section 1104 in the server 1001 receives the character code from the work area 1102 according to the instruction from the control section 1107, and retrieves a character code matching to the character code received from the character information table 1103. Then, the retrieving section 1104 retrieves all character codes having the same group number as the group number of the retrieved character code (S1404).

Then, the retrieving section 1104 outputs the corresponding storage address information to the transmission control section 1106 (S1405).

The transmission control section 1106 receives the corresponding storage address information from the retrieving section 1104 and reads out a font from the font storage area 1105 using the received storage address information (S1406).

Then, the transmission control section 1106 outputs the font read out as described above to the communication control section 1101, and transmits the font from the communication control section 1101 to the client 1002 (S1407).

The communication control section 502 in the client 1002 receives a font from the server 1001 and stores the received font in the work area 503 (S1408).

Figure 15:
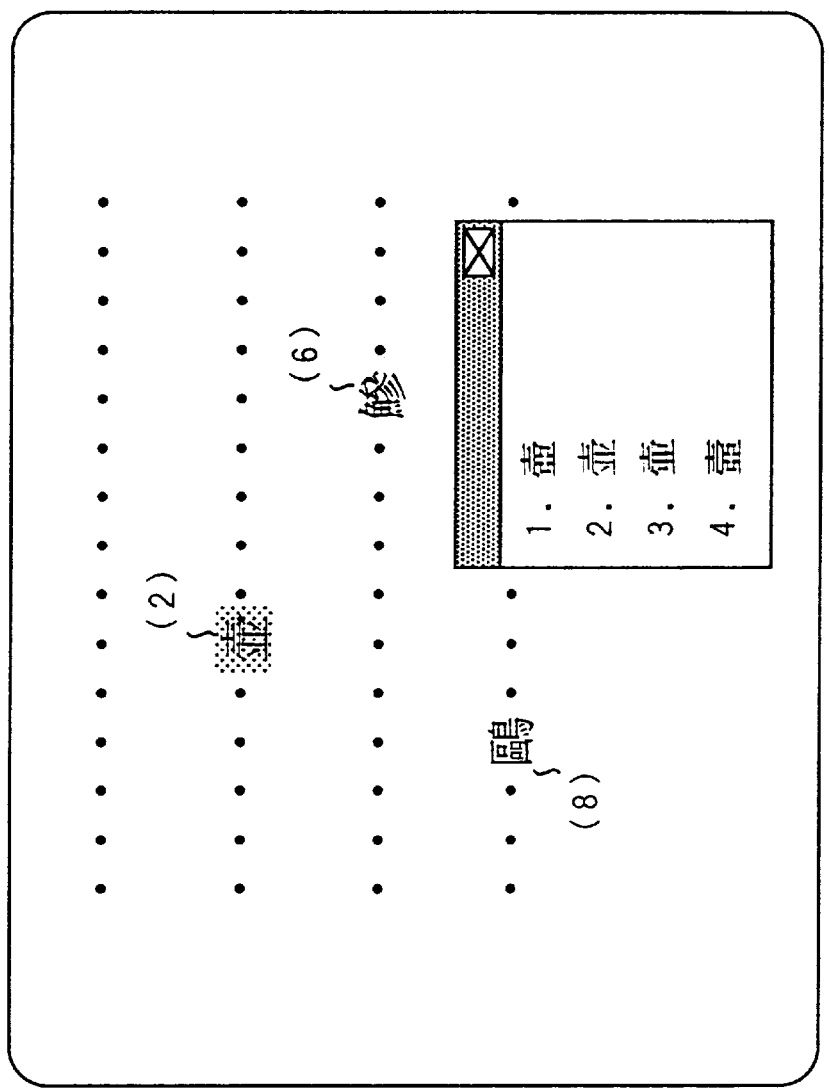
FIG. 15 is an explanatory view showing a case where the character processing method shown in FIG. 14 is executed and a screen display is performed.

The control section 511 reads out, when the font is stored in the work area 503, the font into the display control section 507, and issues an instruction for displaying each character belonging to the same group as candidates for the character (2) in a list form. The display control section 507 reads out the font from the work area 503 according to the instruction from the control section 511, and displays characters belonging to the same group as that of the character (2), as shown in FIG. 15, as candidates, in a list form (S1409).

Then the display control section 507 converts the character (2) displayed on the screen to a character specified by the user among candidate characters displayed in a list and displays the specified character.

As described above, with the character processing system and the character processing method according to Embodiment 2 of the present invention, even in a case where a variant font character having a font not stored in the device is inputted into the client 1002, it is possible to receive the corresponding font from the server 1001 and display the corresponding variant font character on a screen, so that such problems as that an inputted character is not displayed or that an inputted character is garbled can be prevented.

The variant font character described above includes, for instance, Chinese characters. For this reason, even in a case where data described in the Chinese language is inputted through Internet and displayed on a Japanese-language browser, the Chinese characters can be displayed as they are, so that the character processing system and the character processing method according to Embodiment 2 of the present invention is very effective when character information is transmitted via Internet or the like.

It should be noted that, although the character processing apparatus according to Embodiment 1 of the present invention is used as a client, it is possible to use, in place of the character processing apparatus described above, an ordinary type of character processing apparatus comprising a font storage area with fonts for a plurality of character code stored therein; a character information storage area in which storage address information for each character code as well as for fonts corresponding to the character code is stored for each character code; a retrieving section for receiving arbitrary character code, retrieving matching character code from the character information storage area according to the received character code, and outputting storage address information corresponding to the retrieved character code; and a displaying control section for receiving a corresponding font from the font storage area according to the storage address information inputted from the retrieving section and displaying a character corresponding to the arbitrary character code on a screen. Namely, the client may not necessarily be the character processing apparatus according to Embodiment 1, and may have only the function of reading out a corresponding font using the received character code and displaying a character corresponding to the character code on a screen so long as the device can send a request for transmission of a font to the server. Also a device having a function of simply receiving a character code from a client and transmitting a font corresponding to the character code to the client can be used as the server.

FIG. 16 is a block diagram showing a character processing apparatus according to Embodiment 3. The character processing apparatus according to Embodiment 3 comprises a communication control section 1602 for controlling data communication through the network 1601 such as the LAN or the like; a work area 1603 developed in a temporary storage section 1611 such as a RAM or the like for storing therein character code received from the communication control section 1602; a retrieving section 1605 for receiving arbitrary character code from the work area 1603, referring to a character information table 1604 developed in the temporary storage section 1611, and outputting storage address information for a font corresponding to the received character code; an output control section 1607 for receiving the storage address information from the retrieving section 1605, receiving the corresponding font from a font storage area 1606 developed in the temporary storage section 1611, and controlling output of the font corresponding to the arbitrary character code; a printer engine 1608 for receiving the font outputted from the output control section 1607 and printing the character corresponding to the arbitrary character code; an operating section 1609 for setting therein any operating mode or the like; and a control section 1610 for controlling each of the sections.

The character processing apparatus according to Embodiment 3 is different from the character processing apparatus according to Embodiment 1 in that it reads out the corresponding fonts according to the received character code and prints characters onto specified recording paper. However, the only difference is as to whether characters are displayed on the screen or characters are printed onto recording paper. Thus, the operations are as shown in FIG. 7, so that description thereof is omitted herein.

The character processing apparatus according to Embodiment 3 can also be used as the printer 1008 connected to the network 1005 shown in FIG. 10. When the character processing apparatus according to Embodiment 3 is connected to the network 1005 as described above, the character processing apparatus according to Embodiment 3 can be operated as the client 1002 described in Embodiment 2, so that a character processing system can be built up with the server 1001. It should be noted that operations in this case are as shown in FIG. 12 and FIG. 13, so that description thereof is omitted herein.

As described above, with the character processing apparatus according to Embodiment 3, when any variant font character of the font not stored in the apparatus is received, the representative character in the same group as that of the variant font character is printed in place of the variant font character, so that it is possible to prevent any character from not being printed or being garbled as well as to prevent the printed character information from not being recognized and the contents thereof from being misunderstood due to influence of the character garbling or the like when any variant font character of the font not stored in the apparatus is received. The amount of data to be stored can be reduced because fonts corresponding to the character codes for at least representative characters may be stored in the character processing apparatus, which makes it possible to use memory effectively.

Also included in the variant font characters are, for instance, Chinese characters in Chinese the language. For this reason, even when data written in the Chinese language is printed, it is possible to prevent any Chinese character from being garbled.

Furthermore, in the character processing apparatus according to Embodiment 3, when any variant font character of the font not stored in the apparatus is received, a font is displayed on the screen by replacing the variant font character with the representative character in the same group as that of the variant font character. However, only the character shapes are different between the variant font character and the representative character in this case, and the pronunciation and the meaning in the variant font character are the same as those in the representative character, so that any text written in difficult variant font characters can be replaced with easy representative characters each in the same group as that of the variant font character. Accordingly, the character processing apparatus according to Embodiment 3 has an advantage in that any character information written in traditional Chinese characters can be converted to character information written in simplified Chinese characters to be printed when they are inputted.

It should be noted that each of the character processing methods described in Embodiments 1 to 3 can be provided by recording it as a character processing program in a computer-readable medium such as a floppy disk, a hard disk, a CD-ROM, or a DVD or the like.

In the character processing apparatuses according to Embodiments 1 to 3, all the arbitrary character codes to be displayed on a screen is received through a network, but reception of the character code is not restricted to the reception through network, so that it is possible to perform the same processing as described above for character codes as well, for instance, read out from any recording medium such as a floppy disk or a CD-ROM or the like, or outputted by Kana-Kanji converting processing (Japanese character-Chinese character converting processing).

As described above, the character processing apparatus according to the present invention comprises a font memory for storing therein fonts for at least the representative characters among a group of different character shapes comprising representative characters and variant font characters thereof; a character information memory for storing therein storage address information or no-font information for each character code and for fonts corresponding to the character code, type information indicating whether the character code is for a representative character or for any variant font character thereof assigned to each character code, and group information for group numbers for character code among group numbers assigned to classified groups of character code, the each character code group comprising a representative character and variant font characters thereof; a storage address output means for receiving an arbitrary character code, retrieving a matching character code from the character information memory according to the received character code, referring to storage address information or no-font information corresponding to the retrieved character code, outputting, when there is storage address information, the storage address information, retrieving character code having an identical group number as that of the retrieved character code and also having type information for a representative character according to the type information as well as to the group information, and outputting storage address information for the character code; and a display means for inputting therein a corresponding font from the font memory according to the storage address information received from the storage address output means and displaying a character of the arbitrary character code on a screen, and for this reason even when a variant font character with a font not stored in the apparatus is inputted, it is possible to prevent such troubles as that the character is not displayed, or that the character is garbled, and also it is possible to prevent such troubles as that inputted character information can not be identified, or that the contents is recognized incorrectly. Also it only has to store fonts for at least the character codes for the representative characters in the character processing apparatus according to the present invention, so that the volume of data stored in the apparatus can be reduced and also the memory space can be utilized effectively. Further the variant font characters include also Chinese characters used in modern Chinese. For this reason, even when data described in Chinese is inputted through Internet and is displayed on a Japanese-language browser, it is possible to prevent any Chinese character from being displayed with an irregular form, so that the character processing apparatus according to the present invention is very effective in transacting character information through the Internet or the like. It should be noted that, in the character processing apparatus according to the present invention, when a variant font character with a font not stored in the apparatus is inputted, the variant font character is replaced with a representative character belonging to the same group and the representative character is displayed. However, in this case, as the variant font character and the representative character have different character forms but are pronounced the same and have the same meaning, so that it is possible to rewrite a text written with traditional variant font characters, into that written with representative characters. For this reason, the character processing apparatus according to the present invention has the merit that it can convert character information written with traditional Chinese characters to a text written with simplified Chinese characters.

With the character processing apparatus according to the present invention, the storage address output means outputs, when there is the no-font information, the storage address information as well as display changing information for only changing a display for the corresponding character code. The display means displays the corresponding character code, when it receives the storage address information and the display changing information, by a displaying differently from that for other character codes, so that, when an inputted character is a variant font character, it is possible to alert a user that the variant font character has been replaced with a representative character belonging to the same group and the representative character is displayed.

The character processing apparatus according to the present invention comprises a character code replacing means for replacing the corresponding character code with the character code for a representative character when there is the no-font information, so that it is possible to replace the character code for a variant font character with that of a representative character belonging to the same group before delivery to other character processing apparatus, and for this reason it is possible to prevent inputted characters from being garbled in the other character processing apparatus.

In the character processing apparatus according to the present invention, the character code is that defined in Universal Coded Character Set, so that the character code for around 40,000 characters defined in UCS can efficiently be processed.

The character processing system according to the present invention comprises a character processing apparatus comprising a font memory for storing therein fonts for a plurality of character coded, a character information memory for storing therein storage address information for each character code as well as a font corresponding to the character code, a storage address output means for receiving an arbitrary character code, retrieving a matching character code from the character information memory according to the received character code, and outputting storage address information for the retrieved character code, and a display device for inputting therein a corresponding font from the font memory according to the storage address information received from the storage address output means and displaying a character of the arbitrary character code on a screen. The character processing system also comprises a font output device connected through a network to the character processing apparatus for receiving character code from the character processing apparatus and outputting a font corresponding to the character code, and the character processing apparatus transmits the received character code to the font output device when it receives a character code for a font not stored in the apparatus; the font output device retrieves a corresponding font according to the character code received from the character processing apparatus and transmits the retrieved font to the character processing apparatus; and the character processing apparatus displays a character of the character code with the font not stored in the apparatus on a screen using the font transmitted from the font output device, so that, even when a variant font character with a font not stored in the apparatus is inputted into the character processing apparatus, the corresponding font is received from a font output device to display the corresponding variant font character on a screen. It is possible to prevent such troubles as that the input character is not displayed, or that the inputted character is garbled. Further the variant font character includes, for instance, Chinese characters used in modern Chinese. For this reason, even when data written in Chinese is inputted through the Internet and displayed on a Japanese-language browser, the Chinese characters can be displayed as they are, and the character processing system according to the present invention are very effective for transacting of character information through the Internet or the like.

In the character processing system according to the present invention, the character processing apparatus stores the received font in the font memory and also stores storage address information for the received font in the character information memory in correlation to the corresponding character code, so that it is possible to add fonts for variant font characters, which are frequently displayed on a screen but have not been stored yet in the font memory, and for this reason the processing for displaying characters for inputted character code on a screen can efficiently be executed.

In the character processing system according to the present invention, the character code is one defined in the Universal Coded Character Set, so that the character code for around 40,000 characters defined in UCS can efficiently be processed.

The character processing apparatus comprises according to the present invention comprises a font memory for storing therein fonts for at least the representative characters among a group of different character groups comprising representative characters and variant font characters thereof; a character information memory for storing therein storage address information or no-font information for each character code and for fonts corresponding to the character code, type information indicating whether the character code is for a representative character or for a variant font character thereof assigned to each character code and group information for group numbers for character code among group numbers assigned to classified groups of character code, each character code group comprising a representative character and variant font characters thereof; a storage address output means for receiving an arbitrary character code, retrieving a matching character code from the character information memory according to the received character code, referring to storage address information or no-font information corresponding to the retrieved character code, outputting, when there is storage address information, the storage address information, retrieving character code having an identical group number as that of the retrieved character code and also having type information for a representative character according to the type information as well as to the group information, and outputting storage address information for the character code; and a printer for receiving a corresponding font from the font memory according to the storage address information inputted from the storage address output means and executing print processing for the arbitrary character code, so that, even when a variant font character with a font not stored in the apparatus is inputted, it is possible to prevent such troubles as that the inputted character is not printed, or that the inputted character is garbled. Also, it is possible to prevent such troubles as that the printed character information can not be understood, or that the contents are incorrectly understood. Also it only has to store at least the fonts for character codes for representative characters in the character processing apparatus according to the present invention, so that the required data volume can be reduced and the memory space can effectively be utilized. Further the variant characters include, for instance, Chinese characters used in modern Chinese. For this reason, even when data described in Chinese is printed, it is possible to prevent an inputted Chinese character from being garbled. It should be noted that, when a variant font character with a font not stored in the apparatus is inputted into the character processing apparatus according to the present invention, the variant font character is replaced and displayed with a representative character belonging to the same group. However, in this case, the variant font character and the representative character have different character forms but are pronounced the same and have the same meaning, so that it is possible to rewrite a text written with traditional characters to a text written in simplified characters. For this reason, the character processing apparatus according to the present invention has the merit that character information written with traditional Chinese characters can be rewritten to and printed as that written with simplified Chinese characters.

The character processing method according to the present invention with a character processing apparatus comprising a font memory for storing therein fonts for at least representative characters among a group of different character shapes comprising representative characters and variant font characters thereof and a character information memory for storing therein storage address information or no-font information for each character code and for fonts corresponding to the character code, type information indicating whether the character code is for a representative character or for any variant font character thereof assigned to each character code, and group information for group numbers for character code among group numbers assigned to classified groups of character code, each character code group comprising a representative character and variant font characters thereof, the method comprises a first step of inputting an arbitrary character code and retrieving a matching character code from the character information memory according to the inputted character code; a second step of referring to storage address information or no-font information corresponding to the character code retrieved in the first step, outputting, when there is storage address information, the storage address information, retrieving, when there is no-font information, character code having the same group number as that for the retrieved character code and also having type information for a representative character according to the type information as well as the group information, and outputting storage address information for the character code; and a third step of inputting the storage address information outputted in the second step, inputting a corresponding font from the font memory according to the inputted storage address information, and displaying a character of the arbitrary character code on a screen, so that, even when a variant font character with a font not stored in the character processing apparatus is inputted, it is possible to prevent such troubles as that the character is not displayed or that the character is garbled, and also it is possible to prevent such troubles as that the inputted character information can not be understood, or that the contents is incorrectly understood. Also in the character processing method according to the present invention, it is required only to store at least the fonts for the character codes for representative characters, so that a required data volume can be reduced and the memory space can effectively be used. Further the variant font characters include, for instance, Chinese characters used in modern Chinese. For this reason, even when data written in Chinese is inputted through the Internet and is displayed on a Japanese-language browser, it is possible to prevent the Chinese characters from being garbled, so that the character processing apparatus according to the present invention is very effective when character information is transacted through the Internet or the like. It should be noted that, in the character processing method according to the present invention, when a variant font character with a font not stored in the character processing apparatus is inputted, the variant font character is replaced and displayed with a representative character belonging to the same group. However, in this case the variant font character and the representative character are different only in their character forms but are pronounced the same and have the same meanings, so that it is possible to rewrite a text written with traditional variant font characters to that written with simplified representative characters. For this reason, the character processing method according to the present invention has the merit that character information written with traditional Chinese characters can be changed to that written with simplified Chinese characters.

In the character processing method according to the present invention, in the second step, when there is the no-font information, display changing information for changing only a display for the corresponding character code is outputted together with the storage address information; and in the second step, when the display changing information is inputted together with the storage address information, the corresponding character code is displayed by a display method different from that for other character code, when an inputted character is a variant font character, the user is alerted that the variant font character has been replaced with a representative character belonging to the same group and the representative character is displayed.

The character processing method according to the present invention further comprises a character code replacing step of replacing the corresponding character code with that for a representative character when there is the no-font information, so that the character code for a variant font character can be replaced with that for a representative character before delivery to other character processing apparatus, and for this reason it is possible to prevent the inputted character from being displayed with a strange form in other character processing apparatus.

The character processing method according to the present invention using a character processing apparatus comprising a font memory for storing therein fonts for a plurality of character codes, a character information memory for storing therein storage address information for each character code and a font corresponding to the character code, a storage address output means for receiving an arbitrary character code, retrieving a matching character code from the character information memory according to the received character code, and outputting storage address information corresponding to the retrieved character code, and a display device for inputting a corresponding font from the font memory according to the storage address information inputted from the storage address output means and displaying a character of the arbitrary character code on a screen, and also using a font output device connected through a network to the character processing apparatus for receiving character code from the character processing apparatus and outputting a font corresponding to the character code, the method comprises a first step of transmitting, when character code for a font not stored in the character processing apparatus is inputted into the character processing apparatus, the inputted character code to the font output device; a second step of receiving the character code transmitted in the first step with the font output device, retrieving a corresponding font according to the received character code according to the received character code, and transmitting the retrieved font to the character processing apparatus; and a third step of receiving the font transmitted in the step with the character processing apparatus and displaying a character of a character code for a font not stored in the character processing apparatus using the received font on a screen, so that, even when a variant font character with a font not stored in the apparatus is inputted into the character processing apparatus, a font is received from a font output device to display the corresponding variant font character on a screen. For this reason it is possible to prevent such troubles as that the inputted character is not displayed, or that the character is garbled. Further, the variant font characters include, for instance, Chinese characters used in modern Chinese. For this reason, even when data written in Chinese is inputted through the Internet and is displayed on a Japanese-language browser, the Chinese character can be displayed as they are, so that the character processing method according to the present invention is very effective when character information is transacted through Internet or the like.

The character processing method according to the present invention, the third step includes a step of storing the received font in the font memory, and a step of storing the storage address information for the received font in the character information memory in correlation to character code for the font not stored therein, so that it is possible, for instance, to add fonts for variant font characters each with font frequently displayed on a screen but have not been stored yet in the font storage means. For this reason the processing for displaying a character for inputted character code on a screen can efficiently be executed.

In the character processing method according to the present invention, the character code is one defined in the Universal Coded Character Set, so that the character code for around 40,000 characters defined in UCS can efficiently be executed.

In the computer-readable medium, a program for having a computer execute a character processing method according to the present invention is recorded, so that, by causing a computer execute the program, when a variant font character with a font not stored in the character processing apparatus is inputted, it is possible to prevent such troubles as that the inputted character is not displayed or that the character is garbled, and also it is possible to such troubles as that the inputted character information can not be understood, or that the contents are incorrectly understood.

This application is based on Japanese patent application No. HEI 9-32376 filed in the Japanese Patent Office on Feb. 17, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A character processing apparatus comprising:

a font memory for storing therein fonts for at least representative characters among a group of different character shapes comprising representative characters and variant font characters thereof;

a character information memory for storing therein storage address information or no-font information for each character code and for fonts corresponding to the character code, type information indicating whether the character code is for a representative character or for any variant font character thereof assigned to each character code, and group information for group numbers for character code among group numbers assigned to classified groups of character code, each character code group comprising a representative character and variant font characters thereof;

a storage address output means for receiving an arbitrary character code, retrieving matching character code from the character information memory according to the received character code, referring to storage address information or no-font information corresponding to the retrieved character code, outputting, when there is storage address information, the storage address information, retrieving character code having an identical group number as that of the retrieved character code and also having type information for a representative character according to the type information as well as to the group information, and outputting storage address information for the character code; and a display device for inputting therein a corresponding font from the font memory according to the storage address information received from said storage address output means and displaying a character of said arbitrary character code on a screen.

2. A character processing apparatus according to claim 1; wherein said storage address output means outputs, when there is the no-font information, the storage address information as well as display changing information for changing only a display for the corresponding character code; and said display device displays the corresponding character code, when it receives the storage address information and the display changing information, by a displaying method different from that for other character code.

3. A character processing apparatus according to claim 1 comprising a character code replacing means for replacing the corresponding character code with character code for a representative character when there is the no-font information.

4. A character processing apparatus according to claim 1; wherein said character code is that defined in Universal Coded Character Set.

5. A character processing system comprising:

a character processing apparatus comprising a font memory for storing therein fonts for a plurality of character codes, a character information memory for storing therein storage address information for each character code as well as a font corresponding to the character code, a storage address output means for receiving an arbitrary character code, retrieving a matching character code from said character information memory according to the received character code, and outputting storage address information for the retrieved character code, and a display device for inputting therein a corresponding font from said font memory according to the storage address information received from said storage address output means and displaying a character of the arbitrary character code on a screen; and a font output device connected through a network to said character processing apparatus for receiving a character code from said character processing apparatus and outputting a font corresponding to the character code;

wherein said character processing apparatus transmits the received character code to said font output device when it receives character code for a font not stored in the apparatus;

wherein said font output device retrieves a corresponding font according to the character code received from said character processing apparatus and transmits the retrieved front to said character processing apparatus; and wherein said character processing apparatus displays a character of the character code with the font not stored in the apparatus on a screen using the font transmitted from said font output device.

6. A character processing system according to claim 5; wherein said character processing apparatus stores the received font in said font memory and also stores storage address information for the received font in said character information memory in correlation to the corresponding character code.

7. A character processing system according to claim 5; wherein said character code is one defined in the Universal Coded Character Set.

8. A character processing apparatus comprising:
- a font memory for storing therein fonts for at least representative characters among a group of different character shapes comprising representative characters and variant font characters thereof;
- a character information memory for storing therein storage address information or no-font information for each character code and for fonts corresponding to the character code, type information indicating whether the character code is for a representative character or for any variant font character thereof assigned to each character code, and group information for group numbers for character code among group numbers assigned to classified groups of character code, said each character code group comprising a representative character and variant font characters thereof;
- a storage address output means for receiving an arbitrary character code, retrieving a matching character code from said character information memory according to said received character code, referring to storage address information or no-font information corresponding to the retrieved character code, outputting, when there is storage address information, the storage address information, retrieving character code having an identical group number as that of said retrieved character code and also having type information for a representative character according to said type information as well as to the group information, and outputting storage address information for the character code; and
- a printer for receiving a corresponding font from said font memory according to the storage address information inputted from said storage address output means and executing print processing for said arbitrary character code.

9. A character processing method with a character processing apparatus comprising a font memory for storing therein fonts for at least representative characters among a group of different character shapes comprising representative characters and variant font characters thereof; and a character information memory for storing therein storage address information or no-font information for each character code and for fonts corresponding to the character code, type information indicating whether the character code is for a representative character or for any variant font character thereof assigned to each character code, and group information for group numbers for character code among group numbers assigned to classified groups of character code, said each character code group comprising a representative character and variant font characters thereof; said character processing method comprising:
- a first step of inputting arbitrary character code and retrieving matching character code from said character information memory according to said inputted character code;
- a second step of referring to storage address information or no-font information corresponding to the character code retrieved in said first step, outputting, when there is storage address information, the storage address information, retrieving, when there is no-font information, character code having the same group number as that for the retrieved character code and also having type information for a representative character according to said type information as well as said group information, and outputting storage address information for the character code; and
- a third step of inputting the storage address information outputted in said second step, inputting a corresponding font from said font memory according to the inputted storage address information, and displaying a character of said arbitrary character code on a screen.

10. A character processing method according to claim 9; wherein said character code is one defined in the Universal Coded Character Set.

11. A computer-readable medium in which a program for causing a computer to execute a character processing method according to claim 9 is recorded.

12. A character processing method according to claim 9; wherein, in said second step includes the steps of, when there is the no-font information, outputting display changing information for changing a display for the corresponding character code with the storage address information; and
- when the display changing information is inputted together with the storage address information, displaying the corresponding character code by a display method different from that for other character codes.

13. A computer-readable medium in which a program for causing a computer to execute a character processing method according to claim 12 is recorded.

14. A character processing method according to claim 9 further comprising a character code replacing step of replacing the corresponding character code with that for a representative character when there is the no-font information.

15. A computer-readable medium in which a program for causing a computer to execute a character processing method according to claim 14 is recorded.

16. A character processing method of using a character processing apparatus comprising a font memory for storing therein fonts for a plurality of character codes; a character information memory for storing therein storage address information for each character code and a font corresponding to the character code; a storage address output means for receiving an arbitrary character code, retrieving a matching character code from said character information memory according to the received character code, and outputting storage address information corresponding to the retrieved character code; and a display means for inputting a corresponding font from said font memory according to the storage address information inputted from said storage address output means and displaying a character of said arbitrary character code on a screen, and also using a font output device connected through a network to said character processing apparatus for receiving character code from said character processing apparatus and outputting a font corresponding to the character code, said character processing method comprising:
- a first step of transmitting, when character code for a font not stored in said character processing apparatus is inputted into said character processing apparatus, the inputted character code to said font output device;
- a second step of receiving the character code transmitted in said first step with said font output device, retrieving a corresponding font according to the received character code according to the received character code, and transmitting the retrieved font to said character processing apparatus; and
- a third step of receiving the font transmitted in said first step with said character processing apparatus and displaying a character of character code with a font not stored in said character processing apparatus using the received font on a screen.

17. A character processing method according to claim 16; wherein said character code is one defined in the Universal Coded Character Set.

18. A computer-readable medium in which a program for causing a computer to execute a character processing method according to claim 16 is recorded.

19. A character processing method according to claim 16; wherein said third step includes a step of storing the received font in said font memory, and a step of storing the storage address information for the received font in said character information memory in correlation to character code for the font not stored therein.

20. A computer-readable medium in which a program for causing a computer to execute a character processing method according to claim 19 is recorded.

* * * * *